(12) United States Patent
Risen, Jr. et al.

(10) Patent No.: US 6,949,604 B2
(45) Date of Patent: Sep. 27, 2005

(54) POLYURETHANE IONOMER BLENDS AND METHODS FOR THEIR PREPARATION AND FORMATION

(75) Inventors: William M. Risen, Jr., Rumford, RI (US); Mingzhe Wang, Branford, CT (US)

(73) Assignees: Brown University, Providence, RI (US); Callaway Golf Company, Carlsbad, CA (US)

(*) Notice: Subject to any disclaimer, the term of this patent is extended or adjusted under 35 U.S.C. 154(b) by 0 days.

(21) Appl. No.: 10/396,626

(22) Filed: Mar. 25, 2003

(65) Prior Publication Data

US 2003/0199662 A1 Oct. 23, 2003

Related U.S. Application Data

(63) Continuation-in-part of application No. 10/191,237, filed on Jul. 1, 2002.
(60) Provisional application No. 60/367,193, filed on Mar. 25, 2002.

(51) Int. Cl.[7] .............................................. C08G 18/65
(52) U.S. Cl. ...................... 525/123; 525/127; 473/365; 473/372; 473/385
(58) Field of Search ................................. 525/123, 127; 473/365, 372, 385

(56) References Cited

U.S. PATENT DOCUMENTS

| | | | |
|---|---|---|---|
| 5,443,674 A | * | 8/1995 | Fresonke et al. ........ 156/331.7 |
| 5,661,207 A | | 8/1997 | Carlson et al. |
| 5,692,974 A | | 12/1997 | Wu et al. |
| 6,203,451 B1 | | 3/2001 | Rajagopalan |
| 6,207,784 B1 | | 3/2001 | Rajagopalan |

OTHER PUBLICATIONS

Copy of International Search Report dated Dec. 30, 2004.

* cited by examiner

*Primary Examiner*—Rachel Gorr
(74) *Attorney, Agent, or Firm*—Fay, Sharpe, Fagan, Minnich & McKee, LLP

(57) ABSTRACT

The invention relates to blends of improved polyurethane ionomers with other polymers and methods for making the same. It was found that the blends of polyurethane anionomers obtained by using the method of the invention had improved physical properties than those made by conventional methods.

36 Claims, 20 Drawing Sheets

POLYURETHANE IONOMER BLENDS AND METHODS FOR THEIR PREPARATION AND FORMATION

PRIORITY INFORMATION

This application claims the benefit of the filing date of U.S. Provisional Application Ser. No. 60/367,193 filed Mar. 25, 2002 and is a continuation in part of U.S. patent application Ser. No. 10/191,237 filed Jul. 1, 2002.

FIELD OF THE INVENTION

The present invention is directed to the field of polyurethane ionomer chemistry. More particularly, it is directed to blends of improved polyurethane ionomers with at least one additional polymer, more preferably a thermoplastic polymer, and the processes for their preparation, formation and use.

BACKGROUND OF THE INVENTION

Many polyurethane ionomers (PUI's) are known. The known polyurethane ionomers include polyurethane polymers that have ionic sites, which have counter ions associated with them. Some have cationic sites and are "cationomers", and some have anionic sites, such as carboxylate and sulfonate groups, and are "anionomers". When all of the cations associated with anionic polyurethanes (polyurethane ionomers) are protons, the materials can be described as "acid-form polyurethanes". When some or all of the cations are metal ions, such as the $M^{n+}$ ions $Na^+$, $K^+$, $Cs^+$, $Li^+$, $Mg^{2+}$, $Ca^{2+}$, $Sr^{2+}$, $Ba^{2+}$, and $Zn^{2+}$, transition metal ions, lanthanide ions or other types of cations, the materials are broadly called "ionomers".

The known methods for preparing a polyurethane ionomer of a metal ion typically involve the reaction of a diisocyanate (or multiisocyanate) compound with two or more diol (or polyol) compounds, including at least one diol compound which contains at least one carboxylic acid group, to form an acid-form polyurethane. This step is followed by the reaction of the acid-form polyurethane with a source of metal ions, such as a metal salt. The goal is to replace the protons of the acid groups by metal ions. In principle, the products obtained using this synthetic approach can be varied by varying the isocyanate, the acid-containing diol, the other diols, the solvent, temperature, and the metal compound used for proton replacement on the acid groups of the acid-form polyurethane polymer.

Other methods for preparing polyurethane ionomers, especially polyurethane ionomers containing sulfur-containing anionic site-groups, proceed to the acid-form polyurethane in other ways. The acid-formed polyurethanes then proceed to the ionomer by reaction with a metal ion source. When both carboxylate and sulfonate acidic sites are incorporated, the carboxylate site can be introduced through reaction with a carboxylic acid diol, such as dimethylolpropionic acid (DMPA).

Some of the known polyurethane ionomers are described in the publication "Advances in Urethane Ionomers" (Edited by H. X. Xiao and K. C. Frisch, Technomic Publish Company, 1995, ISBN No. 1-56676-289-8). Others are described in the following references: S.-A. Chen and J.-S. Hsu, Polymer 34 (1993), 2769; E. Zagar and M. Zigon, Polymer, 40 (1999), 2727; C.-Z. Yang, T. G. Grasel, J. L. Bell, R. A. Register and S. L. Cooper, J. Polym. Sci., Part B: Polym. Phys., 29 (1991), 581.

Polyurethane cationomers are quite different from the anionomers. Some known polyurethane cationomers are described in the following representative references: W.-C. Chan and S.-A. Chen, Polymer, 29 (1988), 1995; S. Mohanty and N. Krishnamurti, J. Appl. Polym. Sci. 62 (1996), 1993; J. C. Lee and B. K. Kim, J. Poly. Sci., Part A: Polym. Chem., 32 (1994), 1983; X. Wei, Q. He and X. Yu, J. Appl. Polym. Sci., 67 (1998), 2179; and Shenshen Wu and Murali Rajagopalan, WO 96/40378, U.S. Pat. No. 5,692,974 and references therein.

In addition to these ionomers, there are other types of polyurethane compounds containing acidic or basic groups. Among them are polyurethane compounds which are used in latex form for coatings and finishes. Some of those polyurethane compounds designed for dispersion in polar liquids can be considered to be acid-form polyurethanes (e.g., Chien-Hsin Yang, Shih-Min Lin and Ten-Chin Wen, Polymer Science and Engineering, Vol. 35, No. 8, 722 (1995)).

The established synthetic approaches discussed above in which the acid-containing polyurethane is made and then the protons are replaced by metal ions, is referred to herein as the First Established Method ("FEM"). It involves syntheses of an acid form polyurethane directly. The cases in which a polyurethane is modified to include acid groups, such as by sulfonation, is the Second Established Method ("SEM"). These methods have led to some interesting materials with potentially valuable applications. However, the range of properties exhibited by polyurethane ionomers made using the First Established Methods is limited by the reaction process and by the compounds used in the synthesis. Moreover, the overall synthetic process is relatively slow, and it would be advantageous to have a faster synthetic procedure.

The polyurethane ionomers produced by the First Established Method (FEM) are limited by the reactants and by the synthetic process itself. This is seen in the optical and mechanical properties of the polyurethane ionomers produced by the spectral range of the First Established Method; e.g., they tend to appear cloudy. This cloudiness typically is associated with the presence of relatively large phases in non-homogeneous materials. The reasons that the FEM imposes limits on the physical properties are not fully understood, but one reason could be that in some of the syntheses there are competing reactions, such as those between the isocyanate groups and the carboxylic acid groups, that are not present or significant in the improved synthetic method ("ISM") of the present invention. Another reason could be that the final reaction, the reaction between the acid-form polyurethane and the metal ion source, is incomplete. Even if the stoichiometrically desired proportions of acid groups and metal containing molecules are combined in that reaction, the incomplete mixing, incomplete neutralization, and process-dependent formation of ion-containing entities lead to a range of products that can be less than optimal for potential applications. In cases where the metal ion incorporation is incomplete in one of these ways, it is difficult to know what the effective metal ion content actually is, and it sometimes is impossible to know it without carrying out a chemical analysis of the final product.

A Third Established Method ("TEM") for synthesizing polyurethane anionomers takes the advantage of the reaction of a diisocyanate (or multiisocyanate) compound with two or more diol/polyol compounds, including at least one diol or polyol compound which contains at least "one ionic group or potential ionic group". This method is mentioned in several patents, including the following: Marek Gorzynski and Horst Schiirman, U.S. Pat. No. 4,777,224; Steve H. Ruetman and Joginder N. Anand, U.S. Pat. No. 4,956,438; and Klaus Noll and Jurgen Grammel, U.S. Pat. No. 4,092,286. The "potential ionic group" part means an acid group, as in the First Established Method described above.

Transforming the potential ionic group into its salt form often decreases the solubility of the ionic containing species and this is a problem if the synthesis of the polyurethane is carried out in an organic solvent. However, it may cause less of a problem for the synthesis of water dispersible coatings and adhesives. Clearly, the syntheses of hydrophobic thermoplastics and water dispersible coatings and the like are very different matters. As far as can be realized from a review of the prior art, when the TEM of synthesis has been employed, the reaction was carried out either in the presence of water, or was carried out with an ionic containing species that contained large hydrophobic groups to increase its solubility in non-aqueous media which has been achieved in a variety of ways, some of which are described in patents referenced above.

Consequently, the prior art methods discussed above are valuable, but they are limited by such problems as incompletely or inhomogeneously neutralized ionomers, ionomers of limited physical properties and molecular structures, and similar limitations.

Furthermore, poly(ethylene-co-acylate/methacrylate) ionomers are commercialized materials (Surlyn®, DuPont & Company and Iotek™, Exxon Corporation are two commercial brands for example) and have been widely applied, as examples, on golf balls and food packaging. One disadvantage of these commercialized poly(ethylene-co-acrylate/methacrylate) ionomers is that the glass transition temperatures are above room temperature, e.g., the glass transition temperature of Surlyn® 9650 is about 50° C. Thus, the materials feel very hard in the normal human activity temperature range. This disadvantage of poly(ethylene-co-acrylate/methacrylate) ionomers makes them not the perfect candidate for producing golf balls although they are tough materials. Thus, softening the poly(ethylene-co-acrylate/methacrylate) ionomers will provide a new class of materials with more desired properties.

In order to lower the effective glass transition temperature of poly(ethylene-co-acrylate/methacrylate) ionomers, an obvious method is to blend them with a certain portion of rubbery polymer that has a glass transition temperature lower than room temperature. But in order to achieve this goal, the rubbery polymer must be miscible to a significant extent with the poly(ethylene-co-acrylate/methacrylate) ionomers, otherwise, blending of the rubber with poly (ethylene-co-acrylate/methacrylate) ionomers just leads to a material with two glass transition temperatures, one for the rubber and the other for the poly(ethylene-co-acrylate/methacrylate) ionomers. This deteriorates the mechanic strength of the original material and has no useful effect on softening the poly(ethylene-co-acrylate/methacrylate) ionomers.

Thermoplastic polyurethane ionomer rubbers with good homogeneity and ionic-site dispersal are expected to be good candidates for blending into poly (ethylene-co-acrylate/methacrylate) ionomers, because they are tough and have lower $T_g$s (usually around −30° to −50° C.). Thus, in this work, such high quality polyurethane ionomers were blended with poly(ethylene-co-acrylate/methacrylate) ionomers. They were found to have surprisingly high miscibilities. Far-infrared spectra and dynamical mechanical thermal analysis data showed that blending occurred at the molecular level. New peaks due to ionic interactions between the polyurethane ionomers and the poly(ethylene-co-acrylate/methacrylate) ionomers were observed in the spectra of the blends. The glass transition temperature of the polyurethane ionomer in the blends was increased dramatically, which indicated that interactions between the soft segment of the polyurethane ionomers and the poly (ethylene-co-acrylate/methacrylate) ionomers occurred.

Additionally, the improved polyurethane ionomers produced by the present invention can also be quite useful components in polymer mixtures, because they have a combination of ionic and hard and soft segments that can provide a mechanism for true blending interactions at the molecular level. Consequently, the present invention is also directed to blends of polyurethane ionomers produced by applicants' process with other polymers, preferably thermoplastic polymers.

For example, ionomer resins, particularly, copolymers of an olefin and an alpha, beta ethylenically unsaturated carboxylic acid having 10–90% of the carboxylic acid groups neutralized by a metal ion, are interesting materials. Due to their excellent physical and chemical properties, ionomer resins are widely used. The blending of a hard ionomer resin with a softer polymeric material may be promising.

Moreover, thermoplastic polyurethanes (TPUs) are perhaps some of the most appropriate candidates among these softer polymeric materials owing to their toughness, thermal plasticity, wide temperature range, wide range of hardness to choose from, and high elasticity. However, the blends previously produced thereby were not very successful because of numerous processing problems. One reason may be that the compatibility between a non-ionic TPU and an ionomer resin does not appear to be very good.

Polystyrene exhibits good chemical resistance and excellent mechanical performances, especially as a structural material, due to its rigid chain conformation. However, its high brittleness and poor impact- and tear resistance have seriously limited its uses. Extensive efforts have been focused on toughening it. One avenue is the formation of sulfonated polystyrenes and blending of them with other materials.

The ability of the newly synthesized carboxylated polyurethane anionomers of the present invention to blend with a typical TPU was tested by mixing them together and analyzing the results. Separately, polyurethane ionomers were mixed with sulfonated styrene. Furthermore, the miscibility of carboxylated PUIs with ethylene-co-acrylic (or co-methacrylic acid) acid polymer with or without partially neutralization of the carboxylic acid groups and/or other polymers was explored. These tests were designed to provide information about whether carboxylated PUIs can be used as compatibilizers between TPU, sulfonated polystyrene, ethylenic ionomer resins, and other materials. They also help to develop an understanding of how their molecules interact. The present invention is also directed to these blends and the characteristics and properties produced thereby.

SUMMARY OF THE INVENTION

The present invention relates to blends of improved polyurethane ionomers with at least one additional polymer, preferably a thermoplastic polymer, and the methods for making and/or using the same. The polyurethane ionomers utilized in the blends are produced by a unique process. Dynamic mechanical thermal analysis (DMTA) and tensile test techniques were employed to investigate the mechanical properties of the polyurethane ionomers so produced. It was found that the polyurethane anionomers obtained by using the method of the invention have improved physical properties compared to those made by conventional methods.

For example, a major advantage of the polyurethane ionomers produced by the method of the invention is that they exhibit a plateau in the plot of elasticity modulus (as $\log_{10}E'$) vs. temperature over a useful and relatively broad temperature and frequency range. The polyurethane ionomers have nearly temperature-independent elasticity over a 50° C. range in the region of ~-20 to +75° C.

Another advantage produced by the process of the present invention is that the polyurethane ionomers of the invention are optically clearer than the conventionally prepared polyurethane ionomers. Ultraviolet visible (UV-Vis) spectroscopy was used to evaluate the clarity of the ionomers and it was found that the anionomers synthesized from the method of the invention had smaller absorbance throughout the visible range.

A further advantage of the present invention is that the synthetic process of making the polyurethane ionomers is much faster than the known process for equivalent compositions. Additionally, striking tensile strength properties were observed for the polyurethane ionomers.

In order to obtain polyurethane ionomers that are based on anionic polyurethanes with known composition, including known acid-group content, and with complete and controlled replacement of the acid-group protons by designated metal cations, a new synthetic approach was devised. According to the present invention, it is possible to obtain polyurethane ionomers with superior homogeneity and physical properties, as well as a superior process for making the same by employing small sized metal salt powders. In accordance with the invention, the acid-group containing diol was eliminated as a reactant in the anhydrous polymerization by replacing it with its metal salt. In this manner, it is possible to eliminate the acid-groups as reactant sites and to assure that the correct amount of metal ion is incorporated and is distributed well at the molecular level before the formation of the polyurethane is complete.

In accordance with the above, one object of the invention is to provide a new method for producing polyurethane ionomers.

A further object of the invention is to provide a method of producing polyurethane ionomers wherein the reaction time is reduced compared to conventional reaction times.

A further object of the invention is to provide a method for making a polyurethane ionomer by reacting a diisocyanate compound with a polyol compound to form an isocyanate terminated prepolymer which is then reacted with a finely divided substantially anhydrous metal salt of an acid-group containing polyol to form the polyurethane ionomer.

A further object of the invention is to provide a polyurethane ionomer and a method for making the same wherein the polyurethane ionomer has a temperature independent elasticity over a 50° C. range in the region of about -20° C. to about 75° C.

An additional object of the invention is to provide a polyurethane ionomer and a method for making the same wherein the polyurethane ionomer is optically clearer than conventional polyurethane ionomers.

A further object of the invention is to provide a polyurethane ionomer composition comprising one or more polyurethane ionomers which is produced in accordance with the method of the present invention and blended with a thermoplastic polymer.

An additional object of the invention is to provide articles, such as golf balls, which contain at least one polyurethane ionomer composition which is produced in accordance with the method of the present invention and then blended with a polymer comprising ethylene methacrylate, ethylene acrylate, or partially sulfonated polystyrene and their metal ionomers or thermoplastic polyurethanes.

A further object of the invention is to provide compositions and articles made therefrom which contain blends with the polyurethane ionomers made in accordance with the process of the invention.

An additional object of the invention is to provide compositions and articles made therefrom which contain at least one polyurethane ionomer made in accordance with the process of the invention and, additionally, one or more other polymeric-type compounds.

These and other objects and advantages of the invention will become apparent upon reading the detailed description provided below.

BRIEF DESCRIPTION OF THE DRAWINGS

The following is a brief description of the drawings which are provided for the purposes of illustrating the invention and not for purposes of limiting the same.

DETAILED DESCRIPTION OF THE INVENTION

Figure 1:
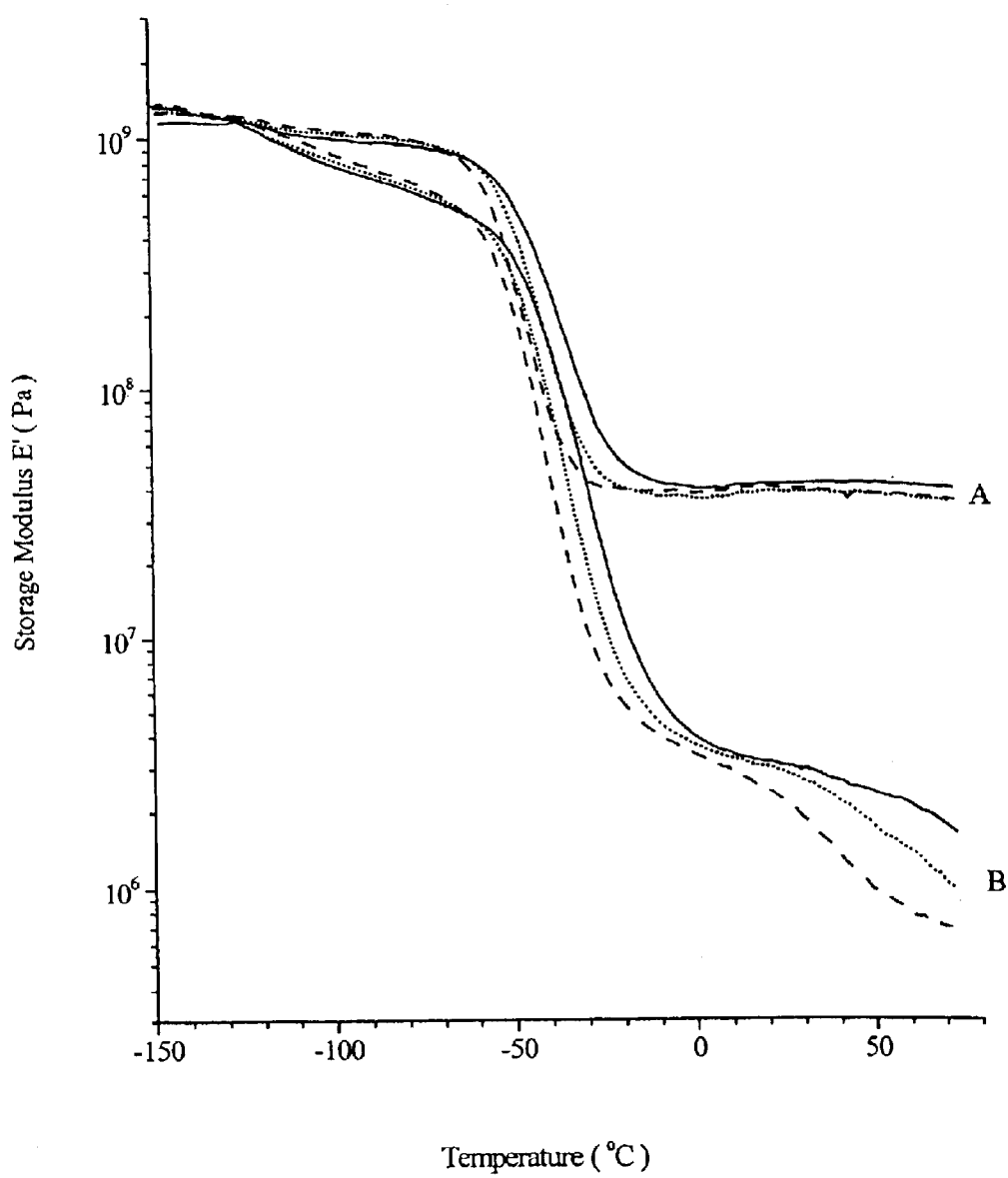
FIG. 1 represents a set of DMTA ("Dynamic Mechanical Thermal Analysis") plots for a zinc polyurethane ionomer, ZnPUI-A, synthesized by the method of the invention (A), and one having the same nominal composition but synthesized by the standard method (B). Data in the form of E' verses temperature were obtained at three different frequencies: (dashed) 0.1 Hz, (dotted) 1.0 Hz and (solid) 10.0 Hz.

The present invention is directed to a unique process for producing polyurethane ionomers and the resulting products produced thereby. Additionally, the present invention is directed to new and unique blends of polymer materials utilizing the polyurethane ionomers.

In accordance with the present invention, two types of syntheses were carried out to produce the polyurethane ionomers in the following way. First, the synthesis of a particular polyurethane ionomer (anionomer nominal composition) was carried out in the manner of the "First Established Method". Then, the synthesis of a polyurethane ionomer with the same nominal composition was carried out using the method of this invention. The method of the present invention employs an anhydrous microcrystalline form of the metal salt of acid-containing diols. Even though such salts would not be expected to be very soluble in the anhydrous solutions or neat anhydrous reactants used to synthesize polyurethanes, it has been discovered that they do react in useful ways.

In developing the process of the present invention, it was discovered that finely divided anhydrous metal salts could be employed so that they would react effectively to improve the solubility of the salt in organic solvents. Accordingly, it was necessary to discover fine and dry microcrystals of the salts that would dissolve in anhydrous solutions at sufficiently high dissolution rates to form the products. These fine microcrystalline salts eliminate side reactions resulting from the presence of water.

As a result, dramatic results were obtained. When the synthesis using the finely divided anhydrous metal salt was used, in accordance with the process of the present invention, the reaction time was greatly reduced compared to existing processes (such as the First Established Method). In many cases, the synthesis time was reduced from about six days (about 140 hours) to about three (3) hours. Moreover, the resulting polyurethane ionomer product was superior. Thus, after removal of the solvent, the material produced by using the new process was clear, tough, strong and had superior mechanical properties over a wide applicable temperature range.

In addition, the composition was assured of being of known stoichiometry. By contrast, the nominally identical polyurethane ionomer made by the "First Established Method" was cloudy and inhomogeneous rather than clear. Thus, the process of the present invention not only had achieved the intended goal of synthesizing polyurethane ionomers of known composition and improved homogeneity, but it also had led to the unexpected discovery of an improved synthesis and of improved polyurethane ionomeric materials.

An additional and quite surprising discovery was also made. In practicing the process of the invention, it was found that in the chain extension step, the efficiency of stirring can affect the properties of the final product. If the stirring is good during the chain extension step, the material properties are excellent. However, if the reaction is not well stirred in that step, a post treatment of the reaction solution can serve to improve the properties. In accordance therewith, polyurethane ionomers made according to the invention were treated in several different manners after the reaction process of the invention had been carried out to stoichiometric completion (i.e., all of the isocyanate groups had reacted). In this manner, it was found that the different post-treatments of the polyurethane ionomers of the invention can give polyurethane ionomers with dramatically different properties if the mixing is not efficient at the chain extension stage.

For example, one result which was especially surprising and potentially very valuable is seen in the mechanical properties of some metal polyurethane ionomers prepared by the method of the invention and then post reaction-treated for some hours in the reaction liquid before being formed into materials. Measurements of the mechanical storage modulus (E') vs. temperature in the range of −150 to 75° C. for some of the purposely poorly mixed and the post-treated materials showed that there is a plateau in this modulus at a high level in the range of about −20° C. to +75° C. This temperature range includes the typical temperature range for human activity which means that the polyurethane ionomers of the invention have a nearly constant E' over a useful range for commercial products. For products whose flexibility and strength is important, constant behavior over that temperature range is very valuable.

New Reaction Process

The processes of the present invention can be illustrated by an example set of reactants, in which the isocyanate source is a diisocyanate, one chain component is a polyether diol and the metal salt is that of DMPA (Dimethylol Propionic Acid). The steps are as follows:

Step 1: Combine a diisocyanate and a polyether diol to prepare the isocyanate terminated prepolymer, I.

Step 2: The prepolymer I is chain-extended by reacting it with a metal dimethylolpropionate (M-DMPA) to form a polyurethane ionomer solution or dispersion.

Step 3: A post treatment when appropriate.

Step 4.: The reaction solvent is removed from the solution or dispersion to form a final polyurethane ionomer product.

The formation of a polyurethane chain is a stepwise polymerization reaction between the functional group hydroxyls (—OH) from a long chain diol or a short chain diol and the functional group isocyanates (—NCO) from a diisocyanate. For this kind of reaction, in order to obtain a polymer with high molecular weight, it is important to control the stoichiometry of the two functional groups. A small mismatch of these two functional groups will result in a polymer with a low molecular weight or an oligomer.

In accordance with a more particular embodiment of the invention, the process of the invention involves reacting a diisocyanate compound having the formula

 (I)

where

A=a straight chain or branched chain aliphatic group, a substituted straight chain or branched chain aliphatic group or an aromatic or substituted aromatic group;

with a polyol having the formula

 (II)

where

B=a straight chain or branched chain aliphatic group, a substituted straight chain or branched chain aliphatic group or an aromatic or substituted aromatic group, a polyether or a polyester and n=1–300;

in a solvent to form an isocyanate terminated polyurethane prepolymer having the formula

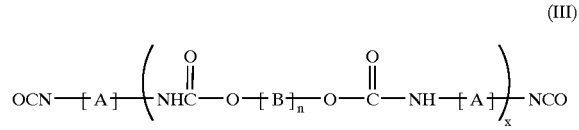 (III)

where x=1 to 100.

The isocyanate terminated prepolymer of formula (III) is then reacted with a finely divided metal salt of an acid-group containing polyol. In a more limited embodiment, the finely divided metal salt of an acid-group containing polyol is a metal dimethylolpropionate having the formula:

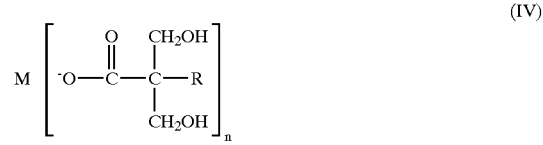 (IV)

where M=$Ba^{2+}$, $Ca^{2+}$, $Cs^+$, $K^+$, $Li^+$, $Mg^{2+}$, $Na^+$, $Rb^+$, $Sr^{2+}$, and $Zn^{2+}$;

R=H or $C_1$–$C_3$ alkyl and n=1 or 2.

The reaction of the isocyanate terminated prepolymer of formula (III) and the metal dimethylolpropionate of formula (IV) produces a polyurethane ionomer having the formula:

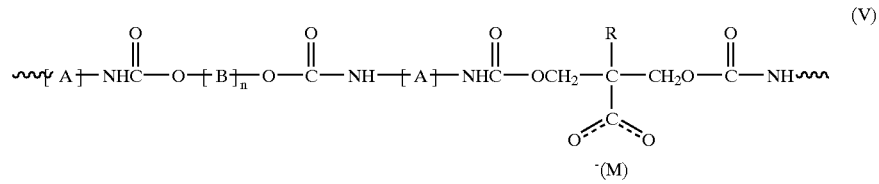 (V)

The following shows an example of the chemical reaction scheme for preparing the polyurethane ionomers according to the present invention.

Additionally, blends of the polyurethane ionomers can be utilized to produce unique products. For example, blends of NaPUI and ZnPUI materials with sodium and zinc Surlyn®

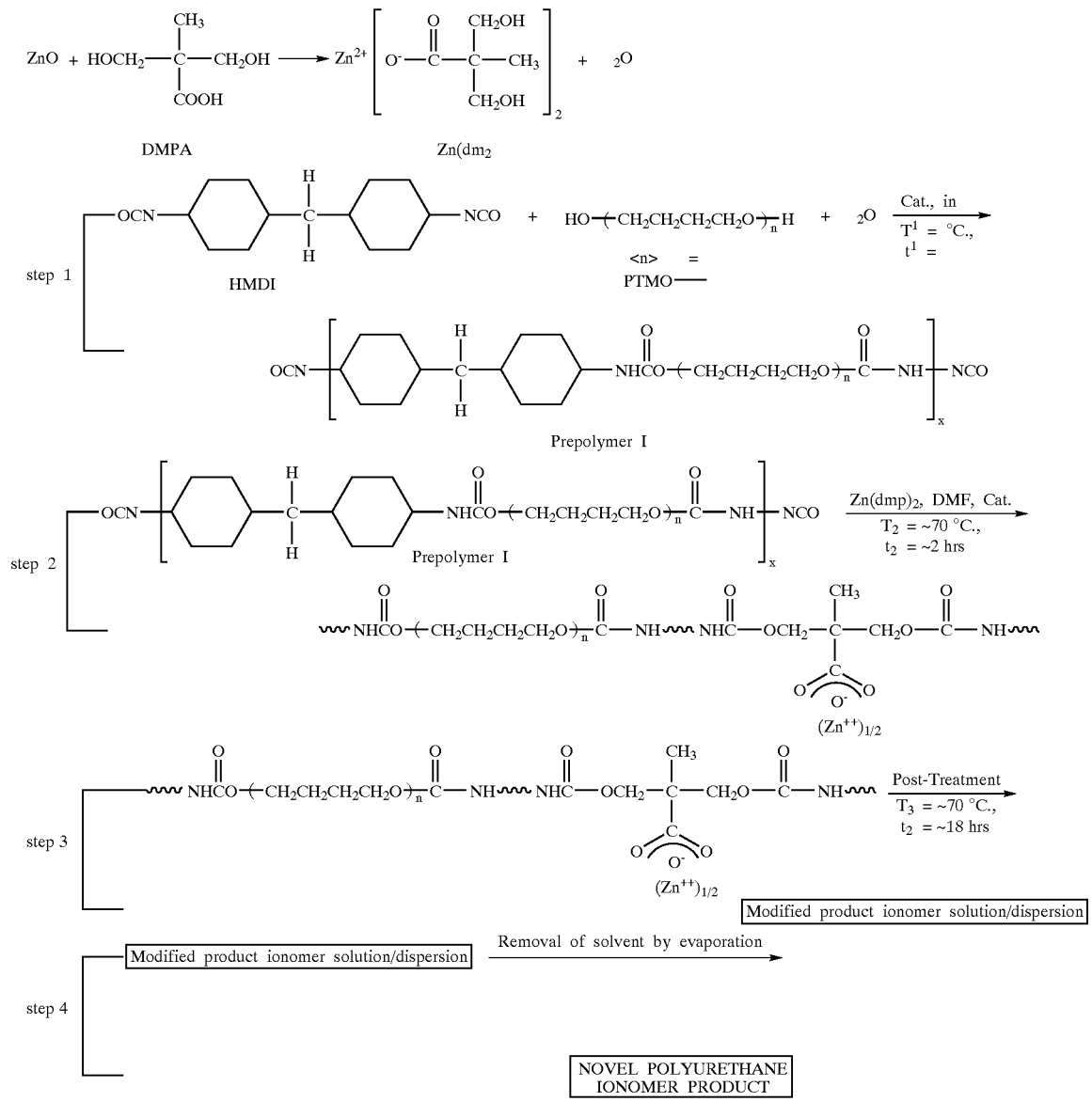

Chemical Reaction Scheme for New Process for Preparation of Novel Polyurethane Ionomers

Blending

The polyurethane ionomers synthesized by the method of the invention can be blended with various materials. Examples of materials which can be blended with polyurethane ionomers include, but are not limited to, thermoplastic polyurethanes (TPUs), sulfonated polystyrenes (SPS) with various sulfonation degrees, acid form poly(ethylene-co-acrylate/methacrylate) and its corresponding ionomers. Twin screw blending, solution blending and melt blending can be employed to achieve blends. This is discussed in more detail below.

materials were made and molded into semispherical "half shells". These were placed around solid golf ball cores and placed in a standard one-cavity golf ball mold. The materials in the mold were heated under pressure, cooled and removed from the mold. Acceptable golf balls were produced in this manner.

Explanation of Notation

Here, Zn(50)PUI-C is a product used as an example to explain the notation of the polyurethane ionomers made herein. In the designation of the final product, the metal symbol specifies what kind of metal cation is used as the counterion of the anionomer. In this case, Zn stands for the zinc ion. The number in the parentheses following the metal symbol indicates the molar percentage of the carboxylic groups from DMPA that was neutralized. If this number is defaulted, it indicates a 100% neutralization of the carboxylic group. Here, PUI is the abbreviation for polyurethane ionomer. The capital letter immediately after the dash sign explains the composition of the prepolymer from which the final PUI is derived. Here "C" designates prepolymer C was used. If nothing follows this capital letter, it means that the PUI was synthesized by the method of the invention as in the present example; otherwise if "(FEM)" follows this capital letter, it means that the polyurethane ionomer was synthesized by the "First Established Method".

Synthesis and Characterization of Metal Dimethylolpropionates Chain Extenders The most direct way to synthesize metal dimethylolpropionates is to take the advantage of the acidity of the carboxylic acid groups, and react them with bases to produce corresponding salts. Then the salts must be separated and purified. The following synthetic method was designed to achieve this. During the reaction with carbonates, the evolution of bubbles and the clarification of the reaction mixture show that the reaction has proceeded as expected. Various metal dimethylolpropionates were synthesized and are listed in Table 1.

sium dimethylolpropionate cannot be readily precipitated by ethanol from its concentrated water solution, but it precipitates when pyridine is added. So pyridine is used instead of ethanol. Lithium and cesium dimethylolpropionates are extremely hygroscopic, so they do not precipitate even when pyridine is used. Instead of precipitating them out, after their reactions are finished, the resultant solutions are concentrated and the remaining water is removed by a distillation process. Toluene is used to codistill the water.

The successful synthesis of the salt chain extenders, metal dimethylolpropionates, is a critical step in the method of the invention. A good synthetic method to prepare the metal dimethylolpropionate powders should meet the following requirements: 1) the hydroxyl groups from the DMPA must survive after the synthesis; 2) the surviving hydroxyl groups must be reactive to isocyanate groups; 3) the prepared salts should be substantially free of water molecules and be fine particles so that surface reaction can be carried out; 4) the salts must be pure enough so that they can be used in stepwise polymerization; and 5) the salts must have at least some minor solubility in the solvent in which polyurethane ionomers will be prepared.

As discussed above, although the solubility of some of these metal dimethylolpropionates is not high in DMF, they do dissolve to a limited extent. When the salt is first added to the reaction system containing the DMF and isocyanates-terminated prepolymer under stirring, the system becomes a slurry, consistent with the low solubility of the salts in DMF.

TABLE 1

Metal Dimethylolpropionate and Selected Properties. The functionality number is the number of hydroxyl groups per formula unit of formula weight (FW).

| Name | | F.W. | Funct. | Sol. in DMF (mg/g) 25° C. | 60° C. |
|---|---|---|---|---|---|
| Lithium dimethylolpropionate | Li(dmp) | 140.1 | 2 | 34.5 | — |
| Sodium dimethylolpropionate | Na(dmp) | 156.1 | 2 | 1.41 | 2.64 |
| Potassium dimethylolpropionate | K(dmp) | 172.2 | 2 | 9.79 | — |
| Rubidium dimethylolpropionate | Rb(dmp) | 218.6 | 2 | 12.8 | 16.9 |
| Cesium dimethylolpropionate | Cs(dmp) | 266.0 | 2 | >34 | — |
| Magnesium dimethylolpropionate | Mg(dmp)$_2$ | 290.6 | 4 | 0.04 | 0.22 |
| Calcium dimethylolpropionate | Ca(dmp)$_2$ | 306.3 | 4 | 0.58 | 0.63 |
| Strontium dimethylolpropionate | Sr(dmp)$_2$ | 353.9 | 4 | ~0 | 0.06 |
| Barium dimethylolpropionate | Ba(dmp)$_2$ | 403.6 | 4 | 0.06 | 0.25 |
| Zinc dimethylolpropionate | Zn(dmp)$_2$ | 331.6 | 4 | 3.32 | 3.94 |
| Nickel dimethylolpropionate | Ni(dmp)$_2$ | 325.0 | 4 | — | 0.26 |

The synthetic procedure for the preparation of sodium, zinc, magnesium, etc., dimethylolpropionates is as follows. A slightly excessive amount of DMPA is used in the preparations in order to achieve complete transformations of the metal carbonates into their carboxylate forms. Since the salts are very soluble in water at room temperature, the solution is concentrated to saturation before the precipitation step is carried out. Typically, ethanol is used to precipitate the salts from their water solutions. Ethanol serves several purposes here. First, it is a poor solvent for the metal salts so that the metal salts can be precipitated; second, it is a good solvent for DMPA, so the unreacted DMPA can be removed from the metal salts. Finally, ethanol is a more volatile solvent than water, so it is easier to dry the salts completely. The purpose of stirring the solution vigorously while ethanol is being poured in is to make sure that the salts are precipitated in very fine microcrystal forms.

Potassium, lithium and cesium dimethylolpropionates are synthesized by modifying the above procedure. The potas- As discussed above, the dissolved salt reacts with the prepolymer and is incorporated into the polymer backbone. Eventually, the solution becomes unsaturated in the salt. The process continues until all the salt is dissolved and consumed by the reaction with the isocyanate-terminated prepolymer.

Comparison of the Synthesis Conditions of Some Polyurethane Ionomers DMTA Measurements and Definition of Constant Slope The DMTA ("Dynamic Mechanical Thermal Analysis") experiments were done on a DMTA Rheometric Mark IV instrument. The samples were molded at about 140° C. for 4 minutes and then cooled to room temperature by using cooling water. The exact temperature depends on the PUI composition. The samples were heated at 3° C./min and the applied sinusoidal force had a frequency of 0.1, 1.0 and 10 Hz. The obtained data were analyzed by using the Rheometric Scientific™ Orchestrator software.

The data from these measurements are presented as plots of E', E" and tan δ versus temperature (° C.) for each measurement frequency. Since E' and E" vary over wide ranges, the scales for them are logarithmic. A plateau, as defined in this work, is a region over which the $\log_{10}E'$ is nearly constant or slowly varying over the specified temperature range for a frequency in the 0.1 to 10 Hz range. More specifically, the plateau can be defined by the negative of the slope of a line fitted in a thus defined region. The definition is that the value of the variable Cs, the negative of the normalized value of the slope, must be smaller than d (d is a small positive number) in a temperature region that is at least 50° C. broad and occurs in the −50° C. to +100° C. range. This variable Cs is defined here as $$Cs = \frac{-\Delta E'}{\Delta T}\left(\frac{1}{E'_{avg.}}\right)$$

Figure 5:
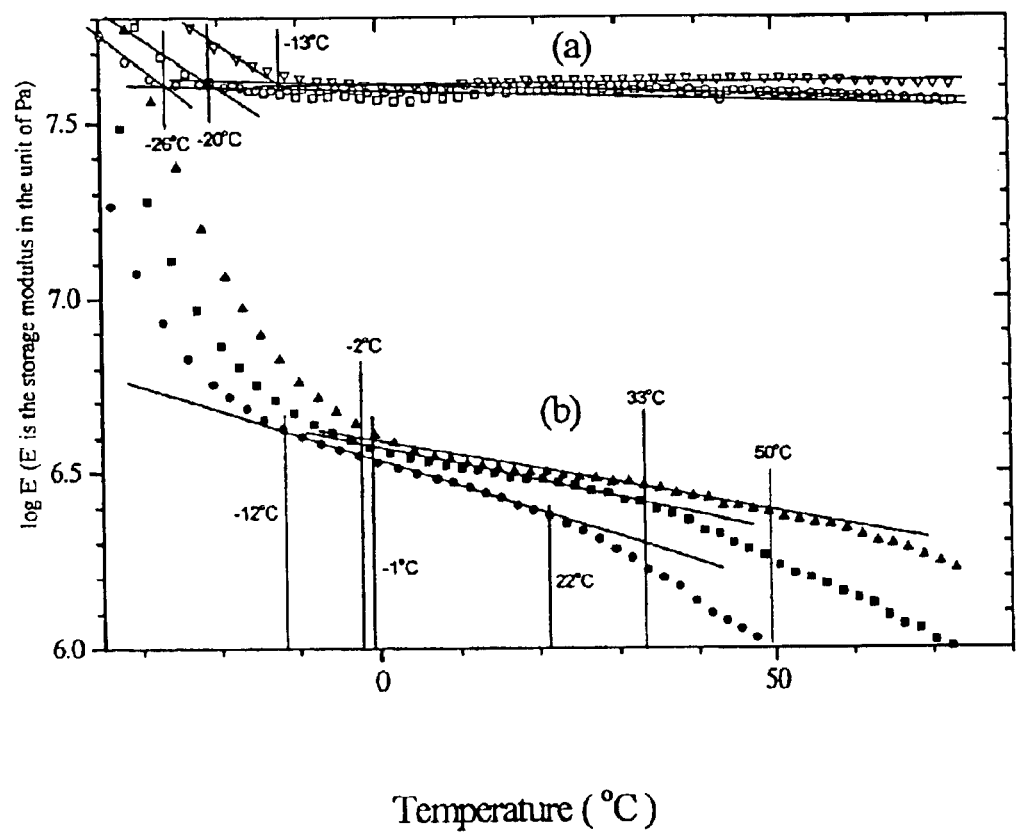
FIG. 5 contains expanded DMTA data of (a) ZnPUI-A and (b) ZnPUI-A (FEM) for the purpose of calculating the Cs.

This definition can be illustrated for the case of (A) (FIG. 1), which is an example of this invention. In this case, as shown by the straight line fitted to the logE' vs. T (° C. scale) plots on expanded scale, the value of Cs is essentially zero at 10 Hz from −13° C. to +75° C., at 1 Hz from −20° C. to 75° C., and at 0.1 Hz from −26°C. to 75° C. In the case of (B) (FIG. 1) in which the analogous ZnPUI-A (FEM), which was made by the "First Established Method", Cs has much higher values. FIG. 5 shows expanded DMTA data of (A) ZnPUI-A and (B) ZnPUI-A(FEM) for the purpose of calculating Cs.

Using the information described above, several examples are constructed in order to further characterize the invention. The examples are set forth below.

EXAMPLES

Example 1

Synthesis of the sodium DMPA salt microcrystals: sodium dimethylolpropionate. 1.02 mole (136.8 g) of DMPA (dimethylol propionic acid) was dissolved in 80 ml water in a 250 ml beaker to form a solution. To this solution, 0.50 mole of sodium carbonate (53.0 g), was added slowly under stirring at 25° C. After the evolution of bubbles ceased or a clear solution was formed, the solution was concentrated to about 150 mL by boiling and evaporating. Then this solution was cooled by ice water and 1000 mL ethanol was poured in under vigorous stirring. The precipitate was filtered, washed with ethanol for 3 times, air dried at 70° C. for 2 days, then dried in vacuo for 2 days at 100° C.

Example 2

Synthesis of rubidium DMPA salt microcrystals: rubidium dimethylolpropionate. The process was carried as in Example 1, but instead of using sodium carbonate, 115.59 of rubidium carbonate was used (purchased from Aldrich Chemical Co.).

Example 3

Synthesis of zinc and nickel DMPA salt microcrystals: zinc and nickel dimethylolpropionates. The process was carried out as in Example 1, but the sodium carbonate was replaced by 40.7 g of zinc oxide or 37.4 g of nickel oxide.

Example 4

Synthesis of alkali DMPA salt microcrystals: magnesium calcium, strontium and barium dimethylolpropionate. The process was carried out as described in Example 1, but the sodium carbonate was replaced by 42.0 g of magnesium carbonate, or 50.0 g of calcium carbonate, or 73.8 g of strontium carbonate, or 98.7 g of barium carbonate. The harvested products were dried in vacuo at 180° C. for another 2 hours after they were dried according to the process in Example 1. The metal carbonates were purchased from Aldrich Chemical Co.

Example 5

Synthesis of the lithium DMPA salt: lithium dimethylolpropionate First, 134.0 g of DMPA was dissolved in 800 ml water in a 2500 ml beaker to form a solution. To this solution, 37.9 g lithium carbonate was added slowly under stirring at 25° C. When evolution of $CO_2$ ceased, the resulting solution was concentrated to about 200 ml by boiling and evaporating. Then a water-oil-distillation-separation process was used to remove the residual water by co-distilling the solution with toluene. The resulting white solid salt was collected and dried in vacuo for 2 days at 100° C. and then stored in a desicator. The lithium carbonate and DMPA were purchased from Aldrich Chemical Co.

Example 6

Synthesis of cesium DMPA salt: cesium dimethylolpropionate The method described in Example 1 was used to synthesize cesium DMPA salt with the replacement of the 37.9 g of lithium carbonate by 162.9 g of cesium carbonate, which was purchased from Aldrich Chemical Co.

Example 7

Synthesis of the potassium DMPA salt: potassium dimethylolpropionate. 1.02 mole (136.8 g) of DMPA was dissolved in 800 ml of water in a 2500 ml beaker to form a solution. To this solution, 0.50 mole of potassium carbonate (69.0 g) was added slowly while being stirred at 25° C. After evolution of bubbles ceased, the resulting solution was concentrated to about 200 ml by boiling and evaporating. Then this solution was cooled by ice water and 1000 ml pyridine was poured in under stirring. The precipitate was collected by filtration, washed with pyridine and dried at 70° C. for 2 days followed by drying in vacuo for 2 days at 100° C.

Example 8

Synthesis of prepolymer A. Prepolymer A is obtained by the reaction of the isocyanate HMDI and the diol PTMO-1000 at the ratio of hydroxyl groups to isocyanate groups of 0.8. A 1000 mL two-neck round bottom flask was charged with 13.20 g (100.00 mmoles of isocyanate groups) HMDI, 39.22 g (78.43 mmoles of hydroxyl groups) of PTMO-1000, 157 mL N,N-dimethylormamide (DMF), a magnetic stirrer bar, a dry nitrogen inlet and a condenser connected with a drying tube filled with Drierite® (anhydrous calcium sulfate). The mixture was stirred and heated to 60° C. After a clear solution was formed, 10.5 mg of dibutyltin dilaurate was added to the flask. Then, the reaction was carried out at 65° C. for 2 hours while stirring under dry nitrogen protection. This results in the formation of prepolymer A, which has isocyanate equivalence of about 2620.

TABLE 2

Compositions of Synthesized Sodium Polyurethane Ionomers

| Prepolymer Code | PTMO1000 (wt %) | PTMO2000 (wt %) | PTMO2900 (wt %) | Isocyanate (wt %) | NCO Equiv. (g/mol) |
|---|---|---|---|---|---|
| A | 74.8 | | | 25.2 | 2620 |
| B | 72.2 | | | 27.8 | 1584 |
| C | 69.0 | | | 31.0 | 1065 |
| D | 65.0 | | | 35.0 | 754 |
| E | 59.8 | | | 40.2 | 547 |
| F | 52.7 | | | 47.3 | 398 |
| G | | 85.6 | | 14.4 | 4580 |
| H | | 84.8 | | 15.2 | 3469 |
| I | | 81.7 | | 18.3 | 1800 |
| J | | 78.8 | | 21.2 | 1244 |
| K | | 74.8 | | 25.2 | 873 |
| L | | 69.0 | | 31.0 | 608 |
| M | | | 89.6 | 10.4 | 6346 |
| N | | | 88.3 | 11.7 | 3757 |
| P | | | 86.6 | 13.4 | 2462 |
| Q | | | 84.3 | 15.7 | 1686 |

Example 9

Synthesis of Prepolymer B, C, D, E or F, with isocyanate and PTMO-1000 at the ratio of hydroxyls to isocyanate groups of 0.7, 0.6, 0.5, 0.4 or 0.3. The reactions were carried out as in Example 8, but the amount of PTMO-1000, DMF and DBTDL were accordingly changed to 34.31 g, 142 mL and 9.5 mg for prepolymer B, 29.41 g, 128 mL and 8.5 mg for prepolymer C, 24.51 g, 113 mL and 7.5 mg for prepolymer D, 19.61 g, 98 mL and 6.6 mg for prepolymer E and 14.70 g, 84 mL and 5.6 mg for prepolymer F. The approximate isocyanate equivalences for prepolymers B, C, D, E and F are 1584, 1065, 754, 547 and 398 as listed in Table 3.

Example 10

Syntheses of prepolymers G, H, I, J, K, and L, with isocyanate and PTMO-2000, at the ratios of hydroxyl groups to isocyanate groups of 0.8, 0.75, 0.6, 0.5, 0.4 and 0.3. The reactions were carried out as in Example 8, but the PTMO-1000 was replaced by PTMO-2000 and the amounts of PTMO-2000, DMF and DBTDL were 78.43 g, 275 mL and 18.3 mg for prepolymer G, 73.53 g, 260 mL and 17.3 mg for prepolymer H, 58.82 g, 216 mL and 14.4 mg for prepolymer I, 49.02 g, 186 mL and 12.4 mg for prepolymer J, 39.21 g, 157 mL and 10.4 mg for prepolymer K, and 29.41 g, 127 mL and 8.5 mg for prepolymer L. The approximate isocyanate equivalences for prepolymers G, H, I, J, K and L are 4580, 3469, 1800, 1244, 873 and 608 as listed in Table 2.

Example 11

Syntheses of prepolymers M, N, P and Q, with isocyanate and PTMO-2900, at the ratios of hydroxyl groups to isocyanate groups of 0.8, 0.7, 0.6, and 0.5. The reactions were carried out as in Example 8, but the PTMO-1000 was replaced by PTMO-2900 and the amounts of PTMO-2900, DMF and DBTDL were 113.72 g, 380 mL and 25.4 mg for prepolymer M, 99.51 g, 338 mL and 22.5 mg for prepolymer N, 85.29 g, 295 mL and 19.7 mg for prepolymer P and 71.08 g, 253 mL and 16.8 mg for prepolymer Q. The approximate isocyanate equivalences for prepolymers M, N, P and Q are 6346, 3757, 2462 and 1686 as listed in Table 3.

Example 12

Synthesis of Na-containing PUI composition NaPUI-A with post treatment. Prepolymer A in its DMF solution as synthesized in Example 8 was combined directly with 1.530 g of sodium dimethylolpropionate (finely ground microcrystals) under vigorous mechanical stirring. The reaction was carried out at 65° C. under dry nitrogen protection. The progress of the reaction was followed by infrared spectroscopy. Specifically, the absorbance at 2163 cm1$^{-1}$, due to the unreacted isocyanate groups, was monitored. This absorbance was essentially zero, demonstrating completion of the reaction, within 2 hours. Stirring was continued for 10–12 hours. The resultant solution was degassed and cast in a Teflon® tray. The solvent DMF was removed by evaporation at 25° C. to form a dry film and then this film was further dried at 60° C. in vacuo for 48 hours in order to remove any residual solvent.

Example 13

Synthesis of Na-containing PUI composition ZnPUI-A. The reaction was carried out as in Example 12, but the reaction was stopped after the IR spectrum showed the completion of the reaction.

TABLE 3

Compositions of Selected Synthesized Sodium and Zinc Polyurethane Ionomers

| Name | PTMO1000 (wt %) | PTMO2000 (wt %) | PTMO2900 (wt %) | Isocyanate (wt %) | M-DMPA (wt %) |
|---|---|---|---|---|---|
| NaPUI-A | 72.7 | | | 24.5 | 2.8 |
| NaPUI-B | 68.9 | | | 26.5 | 4.6 |
| NaPUI-C | 64.4 | | | 28.9 | 6.7 |
| NaPUI-D | 59.0 | | | 31.8 | 9.2 |
| NaPUI-E | 52.4 | | | 35.3 | 12.3 |
| NaPUI-F | 44.2 | | | 39.7 | 16.1 |
| ZnPUI-A | 72.6 | | | 24.4 | 3.0 |
| ZnPUI-B | 68.7 | | | 26.4 | 4.9 |
| ZnPUI-C | 64.1 | | | 28.8 | 7.1 |
| ZnPUI-D | 58.7 | | | 31.6 | 9.7 |
| ZnPUI-E | 52.0 | | | 35.0 | 13.0 |
| ZnPUI-F | 43.8 | | | 39.3 | 16.9 |
| NaPUI-G | | 84.2 | | 14.2 | 1.6 |
| NaPUI-H | | 82.7 | | 14.9 | 2.2 |
| NaPUI-I | | 78.3 | | 17.6 | 4.1 |
| NaPUI-J | | 74.2 | | 20.0 | 5.8 |
| NaPUI-K | | 68.8 | | 23.2 | 8.0 |

TABLE 3-continued

Compositions of Selected Synthesized Sodium and Zinc Polyurethane Ionomers

| Name | PTMO1000 (wt %) | PTMO2000 (wt %) | PTMO2900 (wt %) | Isocyanate (wt %) | M-DMPA (wt %) |
|---|---|---|---|---|---|
| NaPUI-L | | 61.3 | | 27.5 | 11.2 |
| NaPUI-M | | | 88.5 | 10.3 | 1.2 |

Example 14

Synthesis of Na-containing PUI compositions NaPUI-B, NaPUI-C, NaPUI-D, NaPUI-E and NaPUI-F. The reactions were carried out as in Example 13, but prepolymers B, C, D, E and F as synthesized in Example 9 in their DMF solutions were combined directly with 2.296 g, 3.061 g, 3.826 g, 4.591 g and 5.356 g of sodium dimethylolpropionate (finely ground microcrystals), respectively, under vigorous mechanical stirring. The products were listed in Table 3.

Example 15

Synthesis of Zn-containing PUI compositions ZnPUI-A, ZnPUI-B, ZnPUI-C, ZnPUI-D, ZnPUI-E and ZnPUI-F. The reactions were carried out as in Example 13, but prepolymers A, B, C, D, E and F as synthesized in Example 9 in their DMF solutions were combined directly with 1.625 g, 2.438 g, 3.250 g, 4.063 g, 4.876 g and 5.689 g of finely ground zinc dimethylolpropionate, respectively, under vigorous mechanical stirring. The products were listed in Table 3.

Example 16

Synthesis of Zn-containing PUI composition ZnPUI-A by the First Established Method. Prepolymer A in its DMF solution as synthesized in Example 8 was combined directly with 1.320 g of DMPA under vigorous stirring. The reaction was carried out at 65° C. under dry nitrogen protection. The progress of the reaction was followed by infrared spectroscopy as in Example 12. It took more than 144 hours for this absorbance to be essentially zero. 192 mL of DMF was added to the flask to dilute the solution. Then, stoichiometric amount (1.292 g) of zinc acetylacetonate was added and the reaction was carried under stirring at 25° C. for 12 hours. The product was dried following the drying process as in Example 12. It is called ZnPUI-A (FEM). The analogous material made with sodium acetylacetonate in place of zinc acetylacetonate is called NaPUI-A (FEM).

Example 17

Synthesis of Na-containing PUI compositions NaPUI-G, NaPUI-H, NaPUI-I, NaPUI-J, NaPUI-K and NaPUI-L. The reactions were carried out as in Example 13, but prepolymers G, H, I, J, K and F as synthesized in Example 10 in their DMF solutions were combined directly with 1.530 g, 1.913 g, 3.061 g, 3.826 g, 4.591 g and 5.356 g of sodium dimethylolpropionate (finely ground microcrystals), respectively, under vigorous mechanical stirring.

Example 18

Synthesis of Na-containing PUI composition NaPUI-M. The reaction was carried out as in Example 13, but prepolymer M as synthesized in Example 11 in its DMF solution was combined directly with 1.530 g of sodium dimethylolpropionate (finely ground microcrystals) under vigorous mechanical stirring.

Figure 2:
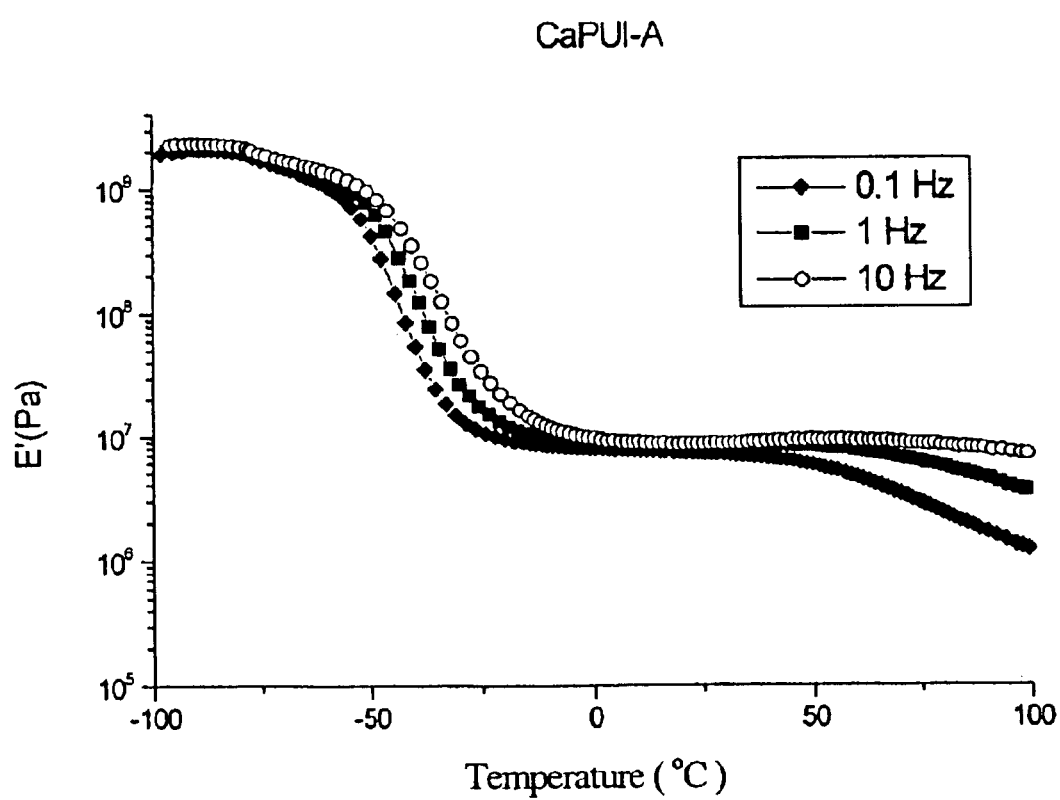
FIG. 2 contains DMTA plots of calcium polyurethane ionomer, CaPUI-A, synthesized by the method of the invention. Sample was heated at 3° C./min. Data were obtained at three different frequencies: (open circles) 10 Hz, (solid squares) 1.0 Hz and (solid diamonds) 0.1 Hz.
Figure 3:
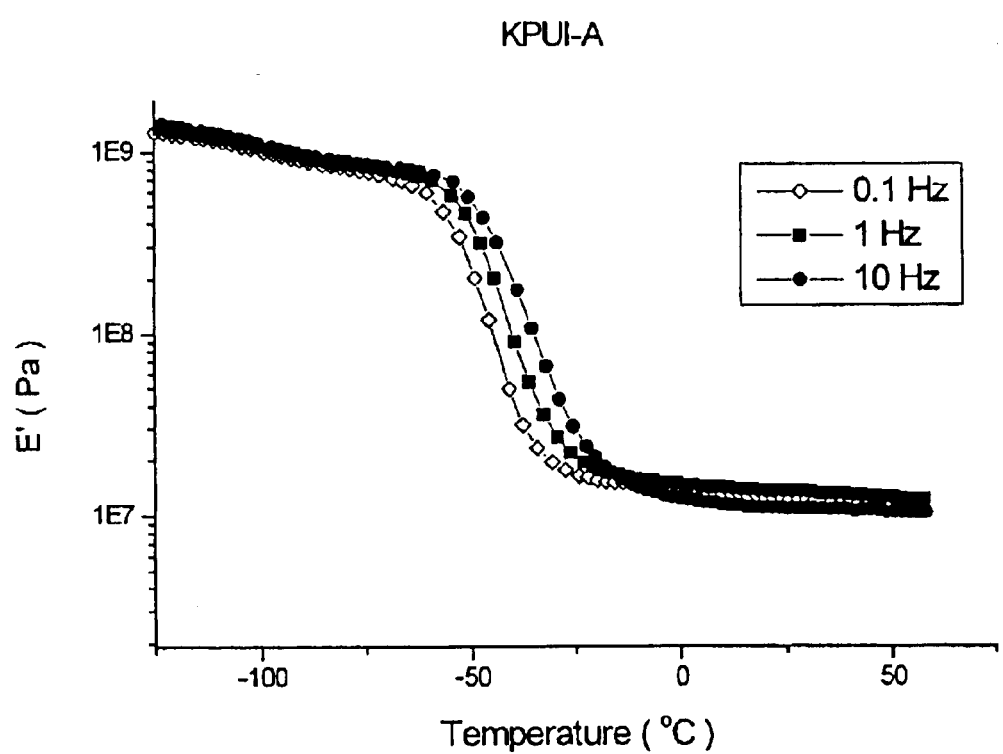
FIG. 3 contains DMTA plots of potassium polyurethane ionomer, KPUI-A, synthesized by the method of the invention. Sample was heated at 3° C./min. Data were obtained at three different frequencies: (solid circles) 10 Hz, (solid squares) 1.0 Hz and (open diamonds) 0.1 Hz.
Figure 4:
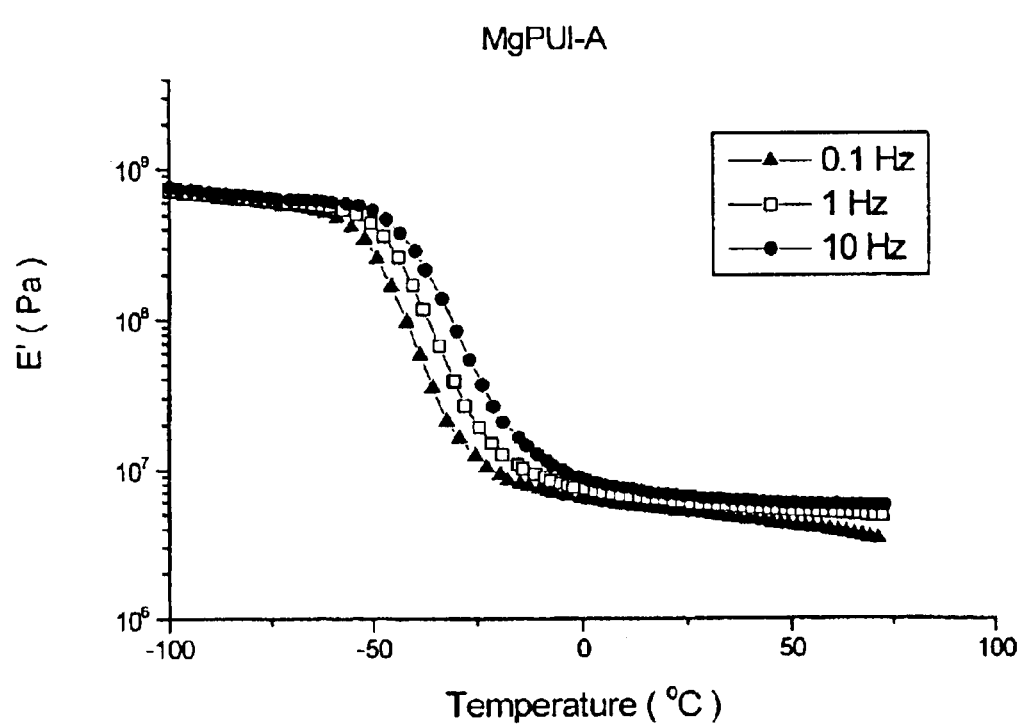
FIG. 4 contains DMTA plots of magnesium polyurethane ionomer, MgPUI-A, synthesized by the method of the invention. Sample was heated at 3° C./min. Data were obtained at three different frequencies: (solid circles) 10 Hz, (open squares) 1.0 Hz and (solid triangles) 0.1 Hz.

Additional polyurethane ionomer compounds were made and analyzed using the various metal salts with prepolymer A for which DMTA plots were obtained. FIG. 2 (CaPUI-A), FIG. 3 (KPUI-A) and FIG. 4 (MgPUI-A) each show DMTA plots for the aforementioned polyurethane ionomers at frequencies of 10 Hz (open circle), 1.0 Hz (solid square) and 0.1 Hz (solid diamond).

Example 19

Prepolymer C in its DMF solution as synthesized in Example 9 was combined directly with 1.530 g sodium dimethylolpropionate (finely ground microcrystals) under vigorous mechanical stirring. The reaction was carried out at 65° C. under dry nitrogen protection for 2 hours. Then, 1.625 g of zinc dimethylolpropionate was added to the reaction system and the reaction was allowed to proceed under the same condition for another 2 hours. The resultant solution was degassed and cast in a Teflon® tray. The solvent DMF was removed by evaporation at 25° C. to form a dry film and then this film was further dried at 60° C. in vacuo for 48 hours in order to remove any residual solvent.

Blends of the Polyurethane Ionomers of the Present Invention with Ionomers or Polystyrene

Example 20A

NaPUI-H was combined with Surlyn® 9650 as follows. 547 g Surlyn® 9650 was added in a Banbury mixer, after it was melted, 254 g NaPUI-H was added. Temperature was kept constant and the mixing process was 10 minutes at the machine's maximum mixing speed with ram down. Then the blend was cool to room temperature by radiation. This material is NaPUI-H/S9650-BL-1 (see Table 4).

TABLE 4

Compositions of Blends of Metal Polyurethane Ionomers with Surlyns ®.

| Name | PUI | Surlyn ® | PUI (wt %) | Surlyn ® (wt %) |
|---|---|---|---|---|
| NaPUI-H/S9650-BL-1 | NaPUI-H | 9650 | 32 | 68 |
| NaPUI-H/S9650-BL-2 | NaPUI-H | 9650 | 25 | 75 |
| NaPUI-H/S9650-BL-3 | NaPUI-H | 9650 | 20 | 80 |
| NaPUI-H/S9650-BL-4 | NaPUI-H | 9650 | 15 | 85 |
| NaPUI-H/S9650-BL-5 | NaPUI-H | 9650 | 10 | 90 |
| NaPUI-H/S9650-BL-6 | NaPUI-H | 9650 | 9 | 91 |
| NaPUI-A/S8660-BL-1 | NaPUI-A | 8660 | 32 | 68 |
| NaPUI-A/S8660-BL-2 | NaPUI-A | 8660 | 25 | 75 |
| NaPUI-A/S8660-BL-3 | NaPUI-A | 8660 | 20 | 80 |
| NaPUI-A/S8660-BL-4 | NaPUI-A | 8660 | 15 | 85 |
| NaPUI-A/S8660-BL-5 | NaPUI-A | 8660 | 10 | 90 |
| NaPUI-A/S8660-BL-6 | NaPUI-A | 8660 | 9 | 91 |
| ZnPUI-A/S9650-BL-1 | NaPUI-A | 9650 | 32 | 68 |

TABLE 4-continued

Compositions of Blends of Metal Polyurethane Ionomers with Surlyns ®.

| Name | PUI | Surlyn ® | PUI (wt %) | Surlyn ® (wt %) |
|---|---|---|---|---|
| ZnPUI-A/S9650-BL-2 | NaPUI-A | 9650 | 25 | 75 |
| ZnPUI-A/S9650-BL-3 | NaPUI-A | 9650 | 20 | 80 |
| ZnPUI-A/S9650-BL-4 | NaPUI-A | 9650 | 15 | 85 |
| ZnPUI-A/S9650-BL-5 | NaPUI-A | 9650 | 10 | 90 |
| ZnPUI-A/S9650-BL-6 | NaPUI-A | 9650 | 9 | 91 |
| ZnPUI-A/S8660-BL-1 | NaPUI-A | 8660 | 32 | 68 |
| ZnPUI-A/S8660-BL-2 | NaPUI-A | 8660 | 25 | 75 |
| ZnPUI-A/S8660-BL-3 | NaPUI-A | 8660 | 20 | 80 |
| ZnPUI-A/S8660-BL-4 | NaPUI-A | 8660 | 15 | 85 |
| ZnPUI-A/S8660-BL-5 | NaPUI-A | 8660 | 10 | 90 |
| ZnPUI-A/S8660-BL-6 | NaPUI-A | 8660 | 9 | 91 |

Example 20B

Five polyurethane ionomers blended with Surlyn® ionomers and used as covers on golfballs had the compositions given as follows. Each comprised x weight percentage NaPUI-H and the balance Surlyn® 9650 (a Zinc Surlyn® based on an 11% acid copolymer and having about 57% neutralization). The values of x are 1.43, 4.29, 7.14, 8.8 and 10.0%. All made acceptable golf balls. The most interesting one was the one with 7.14% NaPUI-H, because it was tested for its properties and they turned out to give the unexpectedly good result that the ball was 2 points softer in compression, 2 points lower in Shore D, and 4 points higher in COR than the same ball with Surlyn® 9650 alone as the cover.

Example 21

Additional blends of NaPUI-H with Surlyn® 9650 were prepared from NaPUI-H/Surlyn® 9650-BL-1 by successive additions of Surlyn® 9650. Thus, 180.3 g Surlyn® 9650 was blended with 710 g of NaPUI-H/Surlyn® 9650-BL-1 to form NaPUI-H/Surlyn® 9650-BL-2 with the same blending equipment and process as in Example 17. The blends NaPUI-H/Surlyn® 9650-BL-n, where, n=1, 2, . . . 6 were blended with compositions listed in Table 4.

Figure 13:
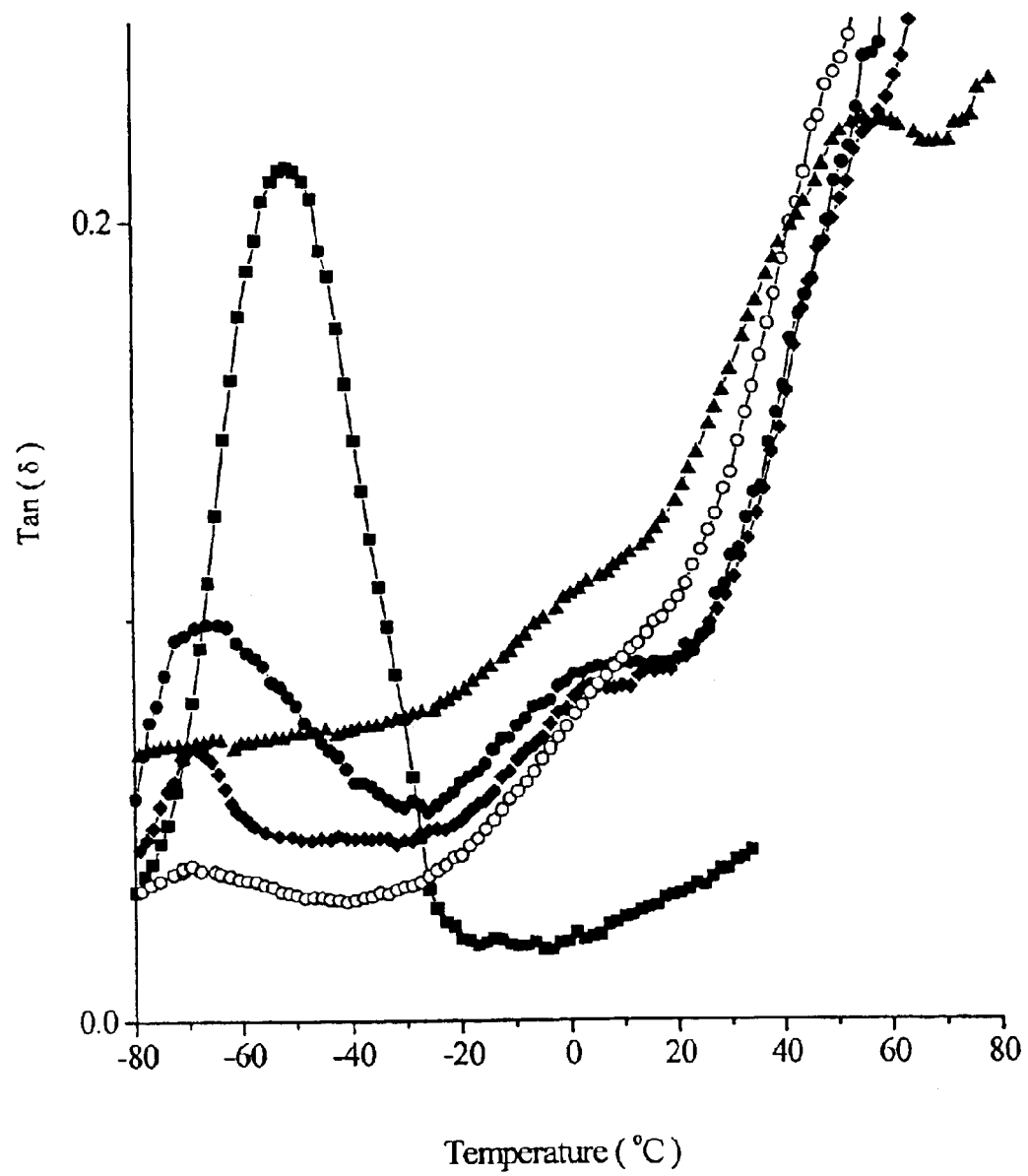
FIG. 13 contains the DMTA data of sodium polyurethane ionomer NaPUI-H, zinc form Surlyn® (Surlyn® 9650) and their blends shown as tan($\delta$) vs. temperature. (▲) Surlyn® 9650; (○) NaPUI-H/Surlyn® 9650-BL-6; (♦) NaPUI-H/Surlyn® 9650-BL-3; (●) NaPUI-H/Surlyn® 9650-BL-1 and (■) NaPUI-H.

FIG. 13 shows DMTA data of NaPUI-H (solid square), Surlyn® 9650 (solid triangle) and blends thereof from Examples 20 and 21 (NaPUI-H/Surlyn® 9650-BL-6 (open circle); NaPUI-H/Surlyn® 9650-BL-3 (solid diamond); NaPUI-H/Surlyn® 9650-BL-1 (solid circle).

Figure 12:
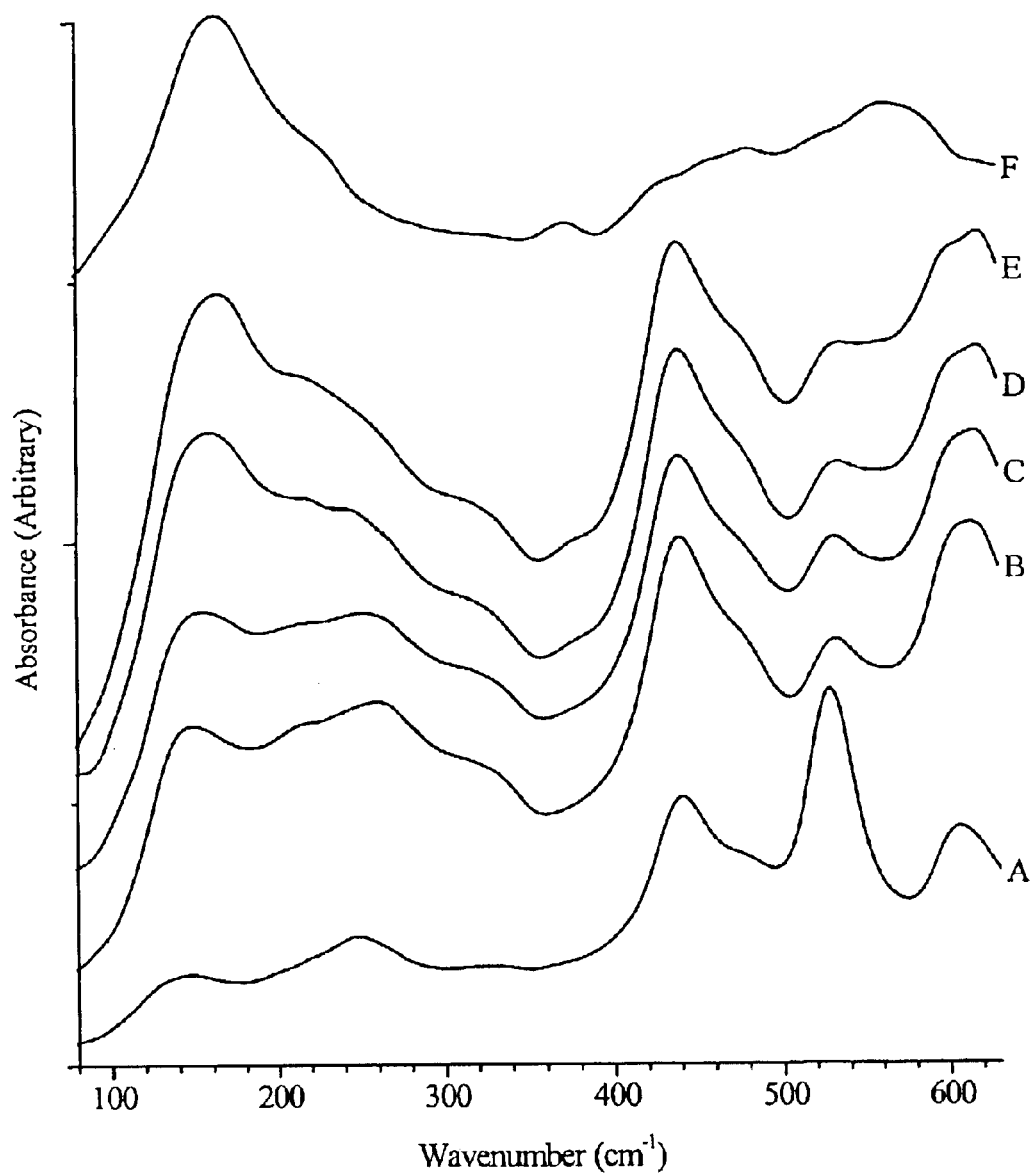
FIG. 12 contains the FT-IR spectra of sodium polyurethane ionomer NaPUI-H, zinc form Surlyn® (Surlyn® 9650) and their blends. (A) Surlyn® 9650; (B) NaPUI-H/Surlyn® 9650-BL-6; (C) NaPUI-H/Surlyn® 9650-BL-4; (D) NaPUI-H/Surlyn® 9650-BL-2; (E) NaPUI-H/Surlyn® 9650-BL-1 and (F) NaPUI-H.

FIG. 12 shows FT-IR spectra of NaPUI-H (line F), Surlyn® 9650 (line A) and blends thereof from Examples 20 and 21 (NaPUI-H/Surlyn® 9650-BL-6 (line B)); (NaPUI-H/Surlyn® 9650-BL-4 (line C)); (NaPUI-H/Surlyn® 9650-BL-2 (line D)); (NaPUI-H/Surlyn® 9650-BL-1 (line E)).

Example 22

NaPUI-A materials were combined with Surlyn® 8660 in the method of Examples 20 and 21 to form blends NaPUI-A/Surlyn® 8660-BL-n, where n 1, 2, . . . 6, listed in Table 3.

Figure 14:
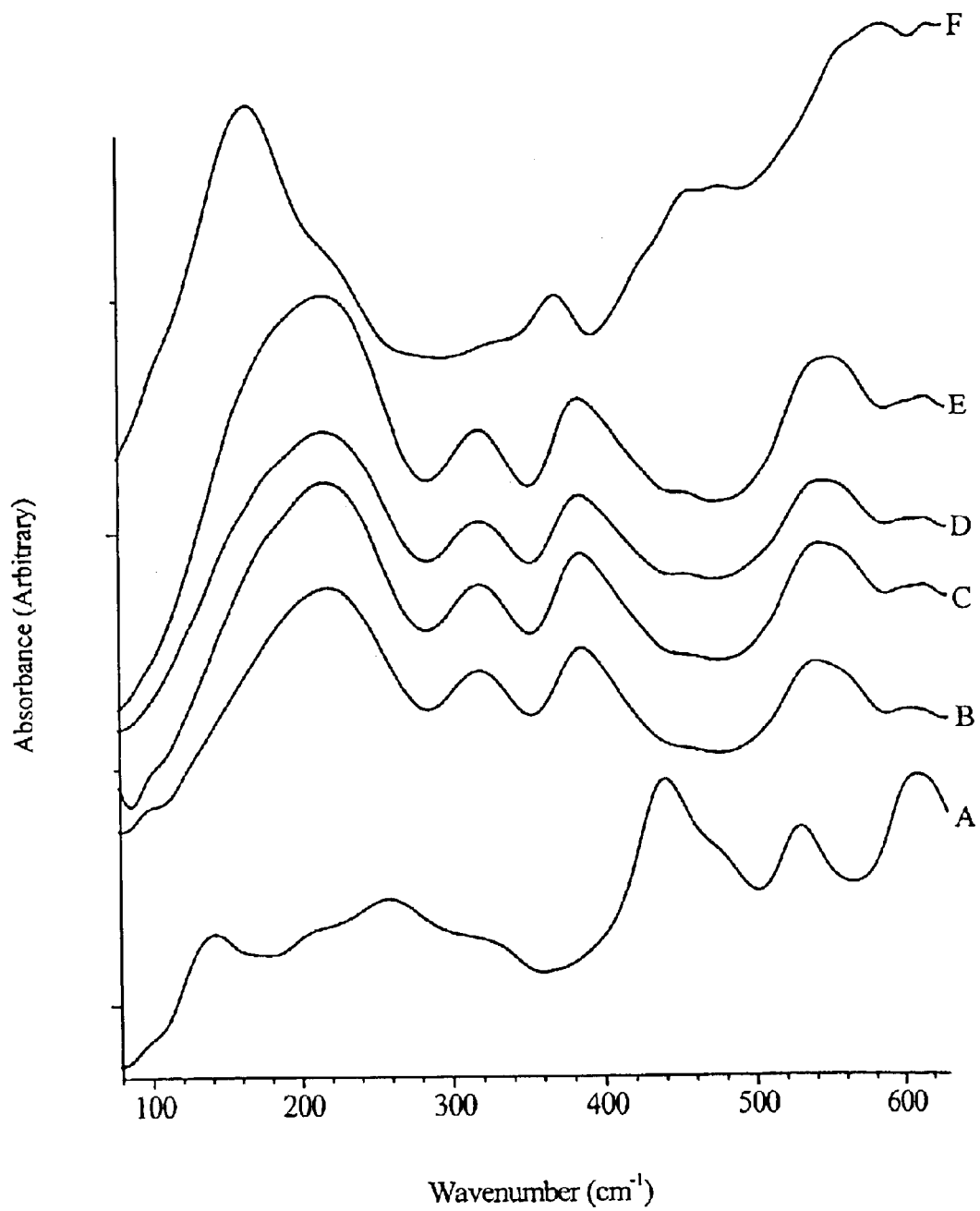
FIG. 14 contains the FT-IR spectra of sodium polyurethane ionomer NaPUI-A, sodium form Surlyn® (Surlyn® 8660) and their blends. (A) Surlyn® 8660; (B) NaPUI-A/Surlyn® 8660-BL-6; (C) NaPUI-A/Surlyn® 8660-BL-4; (D) NaPUI-A/Surlyn® 8660-BL-2; (E) NaPUI-A/Surlyn® 8660-BL-1 and (F) NaPUI-A.

FIG. 14 shows FT-IR spectra of NaPUI-A (line F), Surlyn® 8660 (line A), and blends thereof from Example 22 (NaPUI-A/Surlyn® 8660-BL-6 (line B); NaPUI-A/Surlyn® 8550-BL-4 (line C); NaPUI-A/Surlyn® 8660-BL-2 (line D); NaPUI-A/Surlyn® 8660-BL-1 (line E)).

Example 23

ZnPUI-A materials were combined with Surlyn® 9650 in the method of Examples 20 and 21 to form blends ZnPUI-A/Surlyn® 9650-BL-n, where n=1, 2 . . . 6, listed in Table 4.

Figure 10:
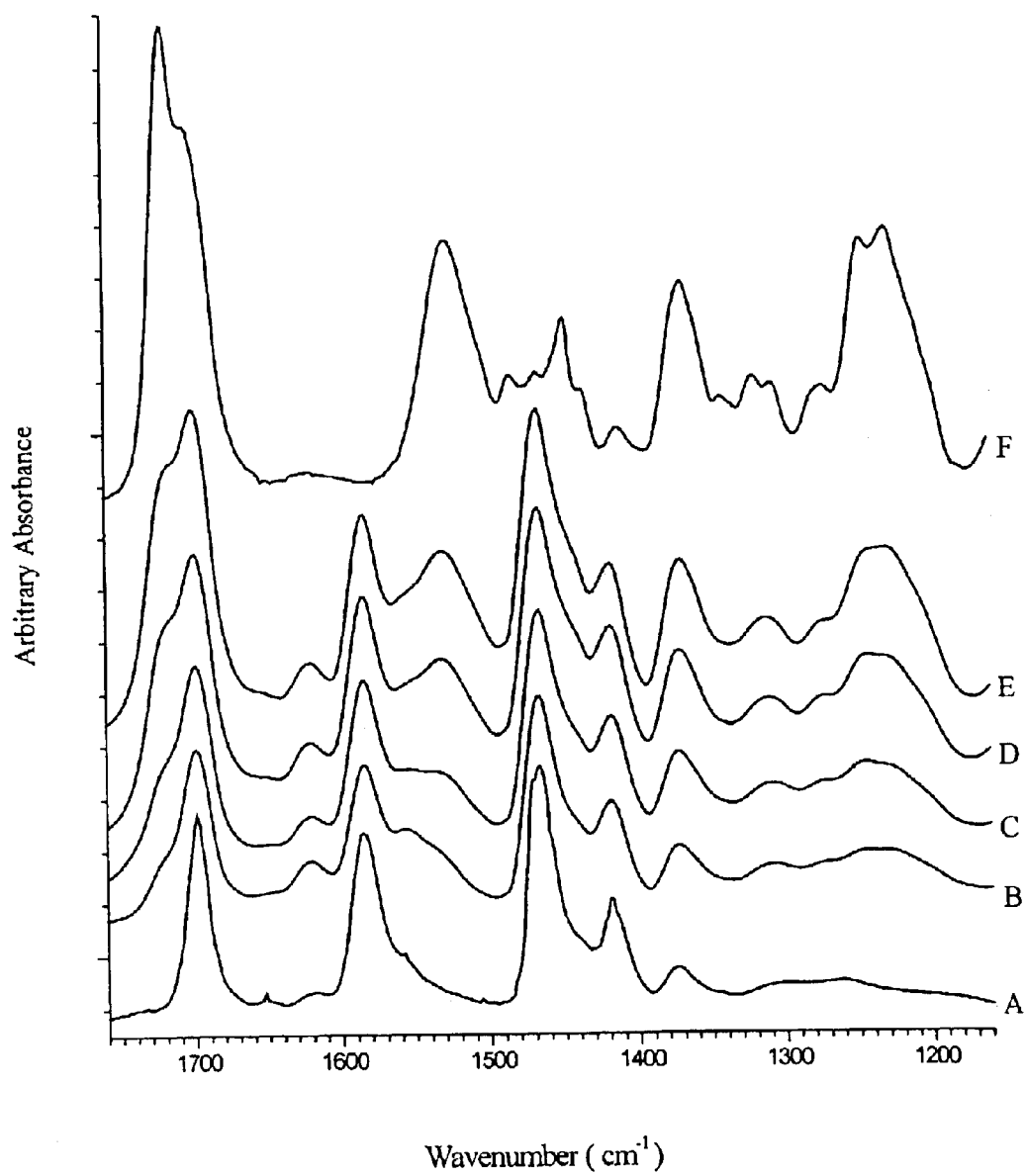
FIG. 10 contains the FT-IR spectra of zinc polyurethane ionomer ZnPUI-A, zinc form Surlyn® (Surlyn® 9650) and their blends. (A) Surlyn® 9650; (B) ZnPUI-A/Surlyn® 9650-BL-6; (C) ZnPUI-A/Surlyn® 9650-BL-4; (D) ZnPUI-A/Surlyn® 9650-BL-2; (E) ZnPUI-A/Surlyn® 9650-BL-1 and (F) ZnPUI-A.
Figure 11:
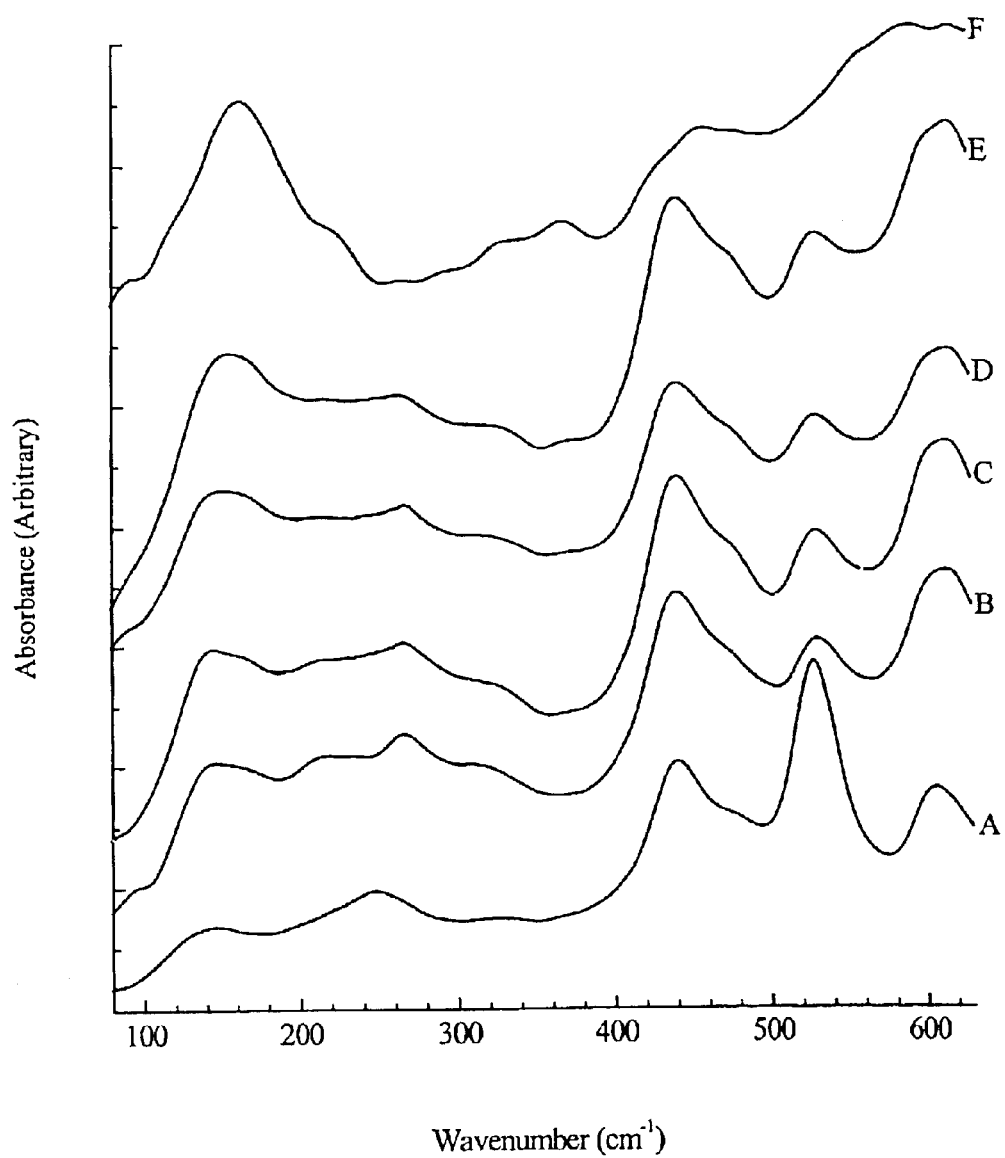
FIG. 11 contains the FT-IR spectra of zinc polyurethane ionomer ZnPUI-A, zinc form Surlyn® (Surlyn® 9650) and their blends. (A) Surlyn® 9650; (B) ZnPUI-A/Surlyn® 9650-BL-6; (C) ZnPUI-A/Surlyn® 9650-BL-4; (D) ZnPUI-A/Surlyn® 9650-BL-2; (E) ZnPUI-A/Surlyn® 9650-BL-1 and (F) ZnPUI-A.

FIGS. 10 and 11 show FT-IR spectra of ZnPUI-A (line F), Surlyn® 9650 (line A) and blends thereof from Example 23 (ZnPUI-A/Surlyn® 9650-BL-6 (line B)); ZnPUI-A/Surlyn® 9650-BL-4 (line C); ZnPUI-A/Surlyn® 9650-BL-2 (line D); ZnPUI-A/Surlyn® 9650-BL-1 (line E)).

Example 24

ZnPUI-A materials were combined with Surlyn® 8660 in the method of Examples 20 and 21 to form blends ZnPUI-A/Surlyn® 8660-BL-n, where n=1, 2, . . . 6, listed in Table 4.

Example 25

Zinc polyurethane ionomer, ZnPUI-A, was blended with sulfonated polystyrene with a 6.9% sulfonation, SPS6.9 according to the following process. 5 g of ZnPUI-A and 95 g of SPS6.9 was combined and dissolved in 900 mL of DMF under stirring at 60° C. to form a clear solution. Then this solution was cast at 60° C. to form a film, which was further dried in vacuo at 60° C. for 24 hours to remove residual solvent. The blend is ZnPUI-A/SPS6.9-BL-1.

Example 26

10 g of ZnPUI-A is combined with 90 g of SPS6.9 in 900 mL DMF as in Example 25 to form blend ZnPUI-A/SPS6.9-BL-2.

Example 27

16 g of ZnPUI-A is combined with 84 g of SPS6.9 in 900 mL DMF as in Example 25 to form blend ZnPUI-A/SPS6.9-BL-3.

Figure 8:
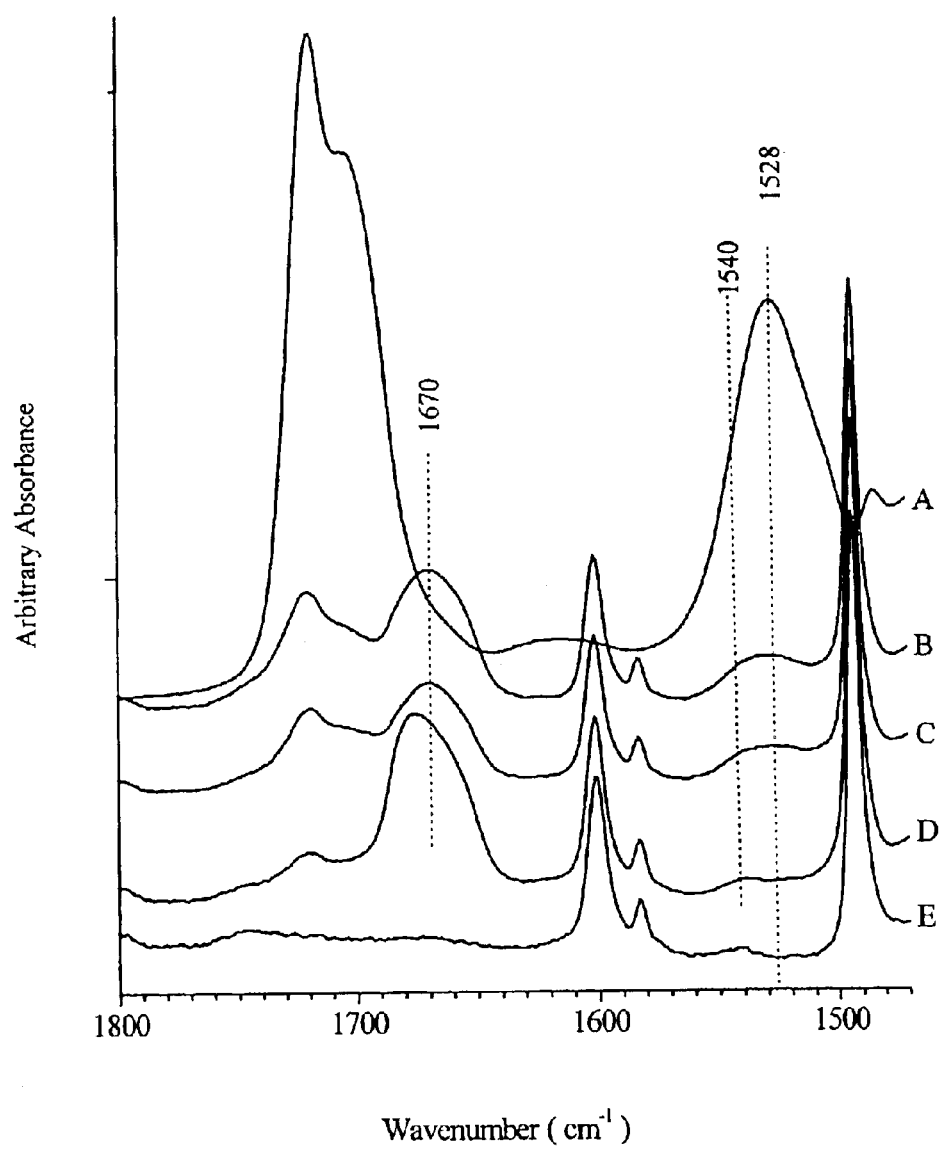
FIG. 8 contains the FT-IR spectra of zinc polyurethane ionomer ZnPUI-A, sulfonated polystyrene and their blends. Spectra were normalized with respect to material concentration. (A), ZnPUI-A; (B) ZnPUI-A/SPS6.9-BL-3; (C) ZnPUI-A/SPS6.9-BL-2; (D) ZnPUI-A/SPS6.9-BL-1; and (E) SPS6.9.
Figure 9:
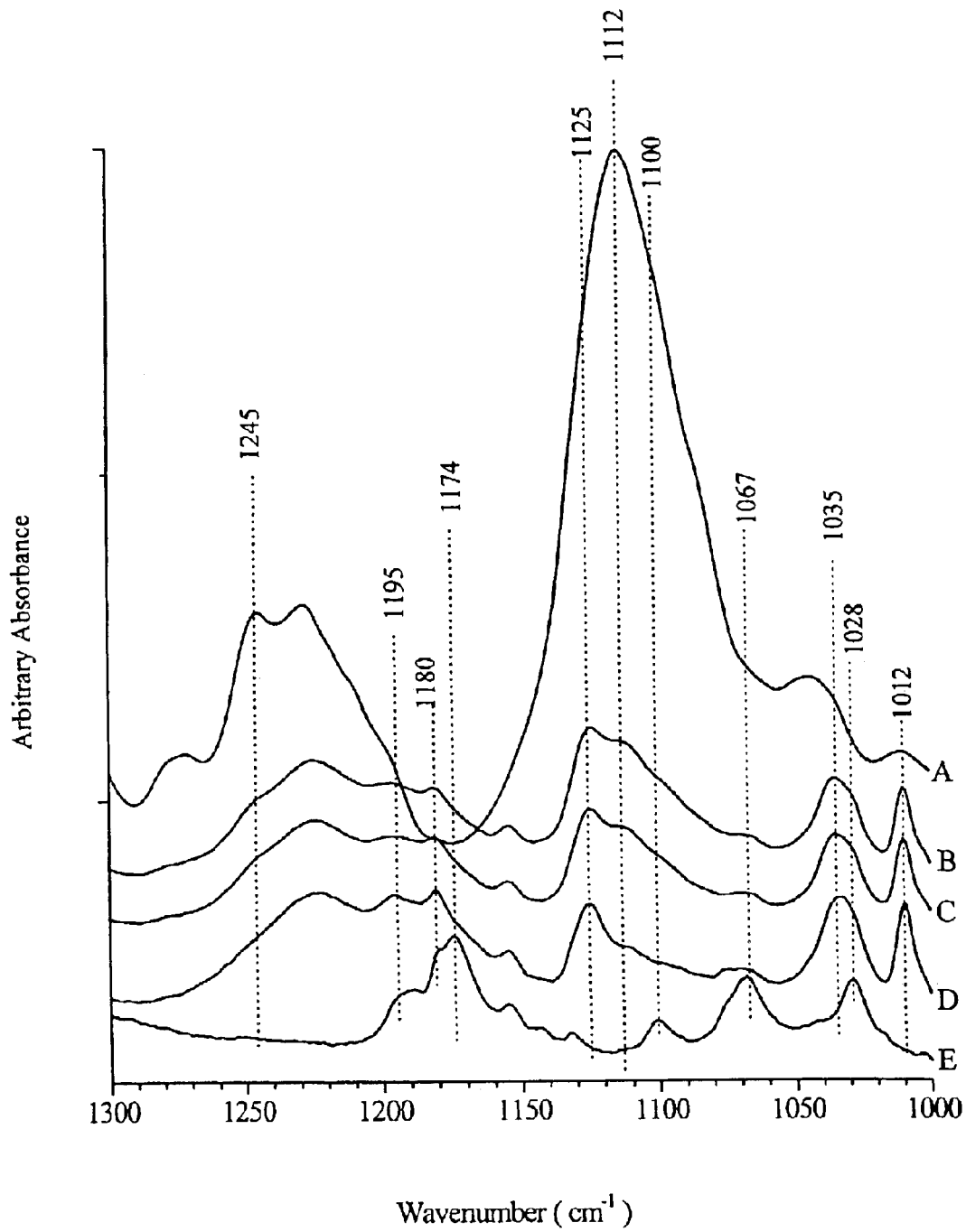
FIG. 9 contains the FT-IR spectra of zinc polyurethane ionomer ZnPUI-A, zinc form Surlyn® (Surlyn® 9650) and their blends. (A) Surlyn® 9650; (B) ZnPUI-A/Surlyn® 9650-BL-6; (C) ZnPUI-A/Surlyn® 9650-BL-4; (D) ZnPUI-A/Surlyn® 9650-BL-2; (E) ZnPUI-A/Surlyn® 9650-BL-1 and (F) ZnPUI-A.

FIGS. 8 and 9 show FT-IR spectra of ZnPUI-A (line A); sulfonated polystyrene (SPS 6.9) (line E) and blends of ZnPUI-A with SPS 6.9 from Example 25 (line D), Example 26 (line C) and Example 27 (line B).

Example 28

5 g of ZnPUI-A was combined with 95 g of SPS3.4, a 3.4% sulfonated polystyrene, in 900 mL DMF as in Example 25 to form blend ZnPUI-A/SPS3.4-BL-1.

Example 29

10 g of ZnPUI-A was combined with 90 g of SPS3.4 in 900 mL DMF as in Example 25 to form blend ZnPUI-A/SPS3.4-BL-2.

Example 30

16 g of ZnPUI-A was combined with 84 g of SPS3.4 in 900 mL DMF as in Example 25 to form blend ZnPUI-A/SPS3.4-BL-3.

Example 31

NaPUI-A was placed in a mold and molded at 140° C. for 4 minutes on a pressurized hot plate and then cooled to room temperature on a pressurized cool plate by using cooling water. Sample bars with the dimensions of ca. 6.0 mm×1.2 mm×15 mm (width×thickness×length) were cut from the molded sheet. These sample bars were measured on a Rhometric Scientific™ 3E machine. The temperature ramp frequency sweep method was used for the measurements, the temperature ramped at 3° C./min from −150° C. to at least 75° C. and the applied sinusoidal force and isolated frequencies of 0.1, 1.0 and 10 Hz. The data obtained were analyzed by using the Rhometric Scientific™ Orchestrator software.

Example 32

Samples listed in Tables 1 and 2 were prepared analogously for DMTA measurements as described in Example 28.

Example 33

Samples of blends for mid IR spectra were prepared as 10 micron slices by microtome.

Example 34

Samples of polyurethane ionomers for mid IR spectra were prepared by solution casting of the PUI solution on a KBr window followed by evaporation of the solvent under nitrogen flow.

Example 35

Samples for far IR spectra were prepared as 100–200 microns thick samples by heating the material just sufficient to make it flow between Teflon sheets under gentle pressure.

Example 36

The infrared spectra were measured by Fourier Transform Infrared Spectroscopy suing a Perkin Elmer 1600 FTIR and a Brucker IBM IFS113 in the 600 to 4000 (in nitrogen) and 20 to 650 $cm^{-1}$ (in vacuum) regions, respectively. For the MIR, 256 scans were averaged to give a spectrum and for the FIR 1024 scans were averaged to yield a spectrum.

Example 37

UV-Vis spectrum sample measurement and preparation. About 0.2 g of ZnPUI-A was sandwiched in between two glass slides at one end. Then the set of glass slides together with the sample was quickly put on a hot plate preheated to about 150° C. and was promptly pressed to form a film with uniform thickness of ca. 1 mm under nitrogen flow. The sample stayed on the hot plate less than 10 seconds in order to minimize decomposition. An HP8452 UV-Vis photodiode spectrometer was employed to obtain a visible spectrum of the polyurethane ionomer. For each measurement, the end of the sample without polyurethane ionomer was scanned first and stored in the spectrometer as the background spectrum, and then the end sandwiched with the polyurethane ionomer film was scanned. The difference of the two spectra was taken as the absorbance spectrum of the polyurethane ionomer. The thus obtained spectrum was normalized with respect to the thickness of the polyurethane ionomer film when the spectrum was presented.

Discussions

Figure 15:
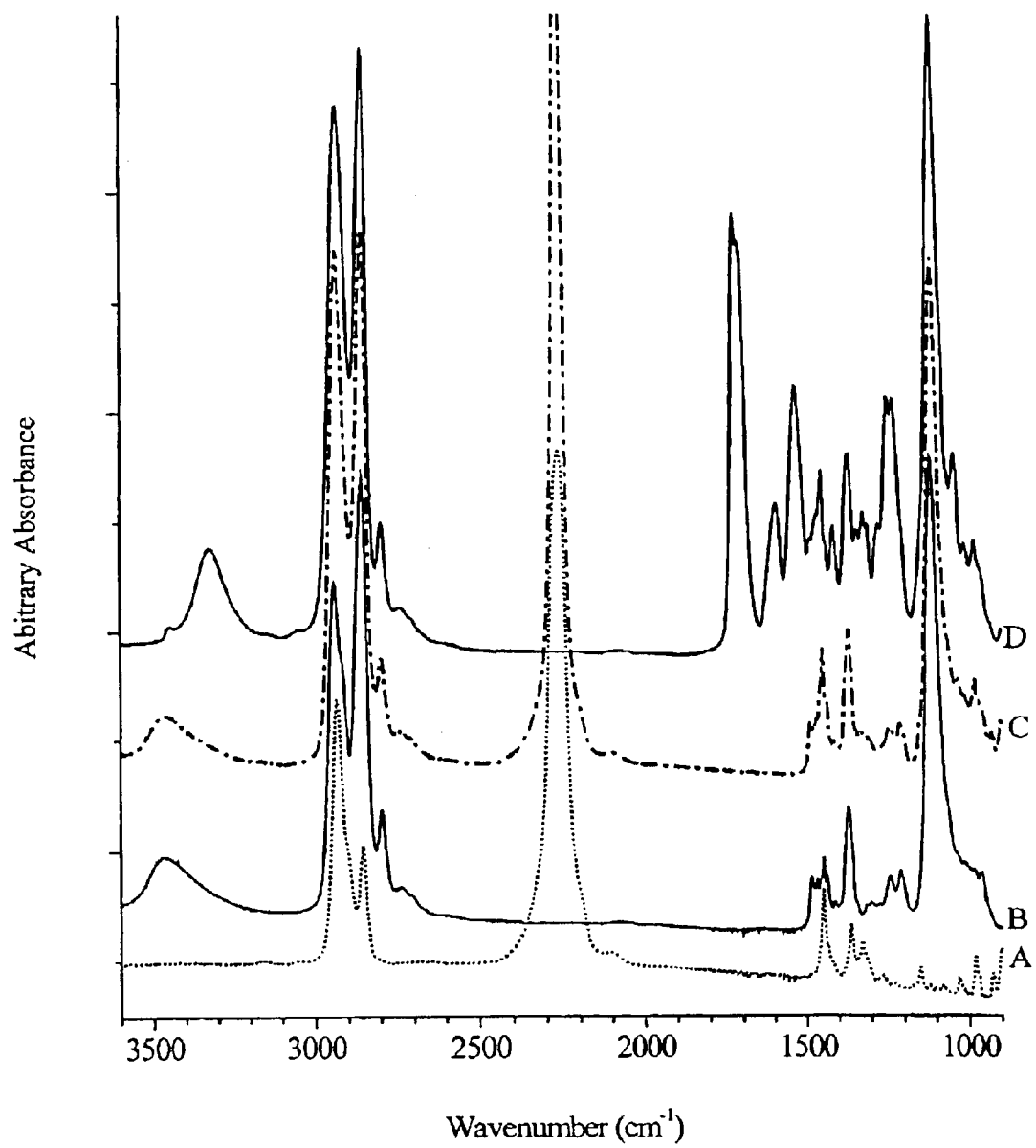
FIG. 15 contains the FT-IR spectra of (A) HMDI, (B) PTMO-1000, (C) mixture of 1.0 mole of HDMI and 0.5 moles of PTMO-1000, and (D) NaPUI-D.

Overall, the syntheses of the metal polyurethane ionomers were successful. The materials were clear, tough films, and their properties are of considerable interest. It first is appropriate to show the overall infrared spectroscopic evidence for the formation of the polyurethane ionomers. In FIG. 15 are shown the spectra of FTIR spectra of A, the spectrum of HMDI; B, the spectrum of PTMO-1000; C, the spectrum of the mixture of 1.0 mole of HMDI and 0.5 mole of PTMO-1000; and D the sodium salt chain extended polyurethane ionomer, NaPUI-D, in the range of 3600 to 500 $cm^{-1}$. It is important to note the presence in FIG. 15 of bands at 3325 $cm^{-1}$ and 1720 $cm^{-1}$, due to the formation of the urethane linkage, and the band at 1590 $cm^1$ due to the C=O stretching of —COO$^-$Na$^+$ groups. The sodium salt chain extender was incorporated into the polymer backbone. The spectra in FIG. 15 also show that the isocyanate groups and the hydroxyl groups are consumed in the reaction by the disappearance of the bands at 2263 $cm^{-1}$ and 3470 $cm^{-1}$ due to N=C=O and O—H stretching vibrations.

Figure 6:
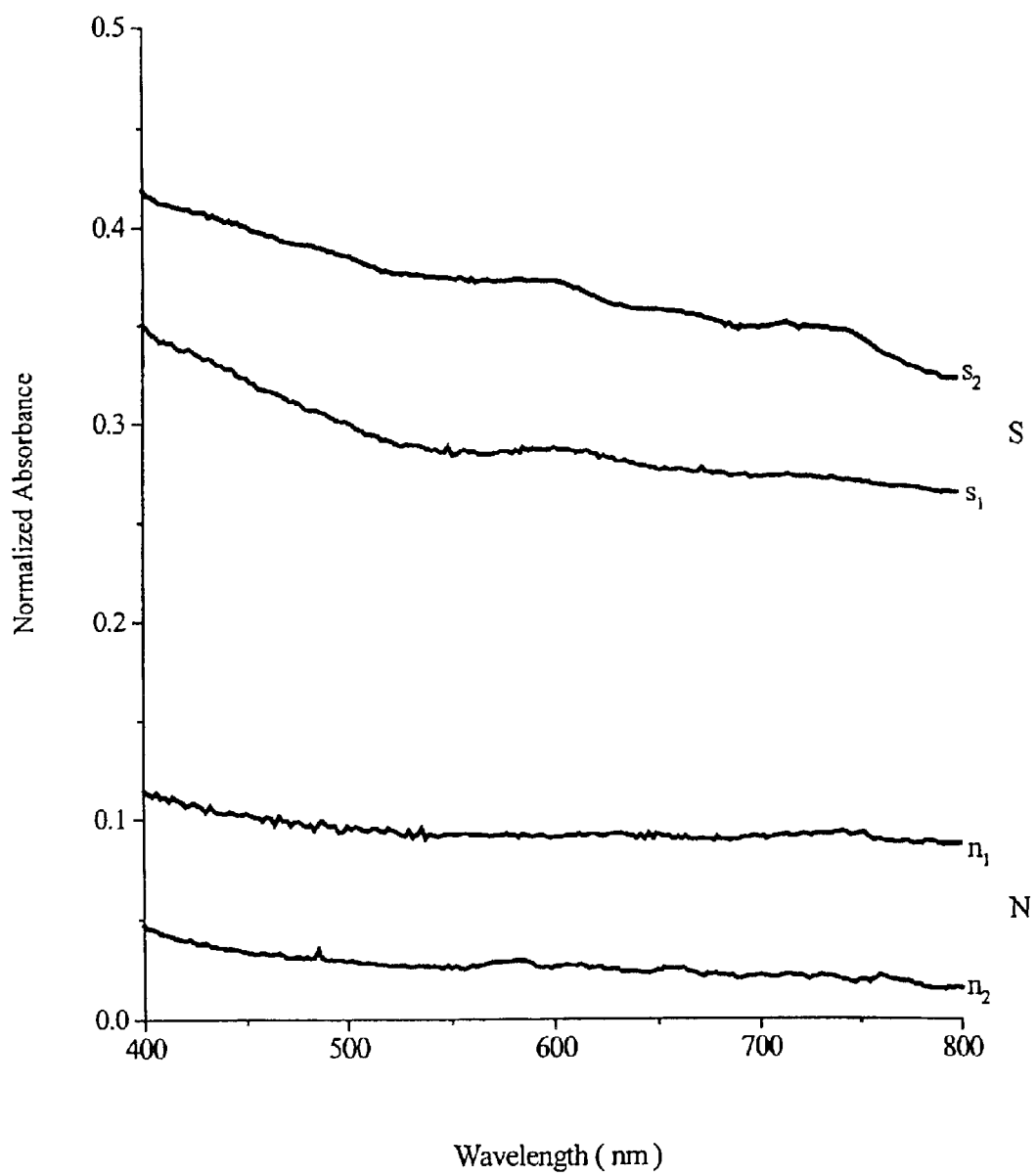
FIG. 6 contains visible spectra of polyurethane ionomers synthesized by the method of the invention (N) and by the standard method (S), FEM. $n_1$, sodium ionomer by the method of the invention; $n_2$, zinc ionomer by the method of the invention; $s_1$, sodium ionomer by the standard FEM method; and $s_2$, zinc ionomer by the standard FEM method.

Further, the next method of the invention yields polyurethane ionomers with better optical clarity. In order to compare the effect of synthetic methods on the clarity of the resultant products, two sets of polyurethane ionomers, Set N and Set S, were synthesized by the method of the invention and the standard method, respectively. Each set consists of two ionomers, $n_1$ and $n_2$ in set N and $s_1$ and $s_2$ in set S. Here, $n_1$ and $s_1$ are sodium ionomers with the same nominal compositions, and $n_2$ and $S_2$ are zinc ionomers having the same nominal composition. Their visible spectra are shown in FIG. 6 in the range of 400 and 800 nm. The spectra of the ones synthesized by the method of the invention are labeled $n_1$ for the sodium ionomer and $n_2$ for the zinc ionomer and the ones synthesized by the standard method are labeled as $s_1$ for the sodium ionomer and $s_2$ for the zinc ionomer in the figure. It can be seen that the ones synthesized by the method of the invention had lower absorbance than the ones synthesized by the standard method in the whole visible range. Since the spectra are normalized to the thickness of the films and the compositions are the same, the difference of the absorbance results from the synthetic methods, which are the only differences that these two samples had. The optical properties in this region are caused by light scattering, which accounts for the overall shapes of the curves. Evidently, the standard method leads to materials with many refractive index inhomogeneities with sizes on the order of the wavelength of the UV visible light, or up to about 0.5 microns. The method of the invention leads to more homogeneous materials in this sense.

Figure 16:
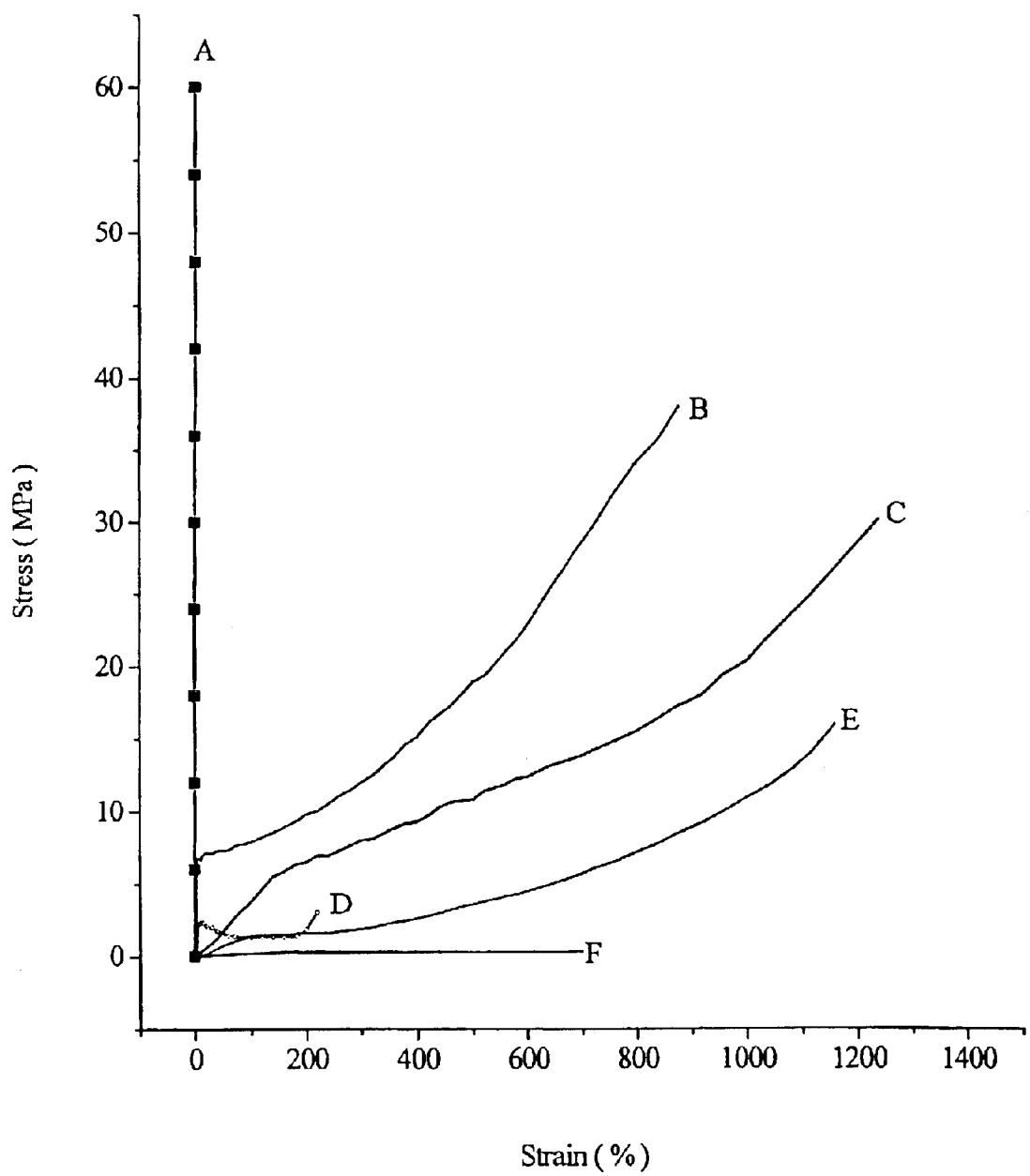
FIG. 16 is a chart which shows stress vs. strain of certain materials: (A) polystyrene, (B) PUI synthesized by Chen, et al., (C) PUI synthesized by the method of this invention (NaPUI-H), (D) high density polyethylene, (E) PUI synthesized by Xiao, et al., and (F) polyisobutyl rubber.

The tensile behavior of the polyurethane ionomer synthesized using the method of the invention based on HMDI, PTMO-2000 and DMPA units is shown in FIG. 16 as curve C. The crosshead of the machine reached its limits before it broke the sample, so the data represents a lower limit of the strength of the material. Curve B is the polyurethane ionomer based on MDI, PTMO-2000 and DMPA units synthesized by Chen et al. (Polymer 34, 2769 (1993)) using the standard method, and curve E is the polyurethane ionomer based on MDI, PCL-2000 and N-methyldiethanolamine by Xiao et al. ("Advances in Urethane Ionomers", Technomic Pub. Co., Lancaster, 1995)). The tensile properties of some well-known materials also are shown in FIG. 16 for comparison. Thus, (A) is polystyrene (D) high density polyethylene and (F) polyisobutyl rubber. Polystyrene is a brittle material with high modulus, so when a stress is applied, strain develops, but strain at break is very small. On the other hand, the elastomer polyisoprene (isobutyl rubber) extends a lot when a small stress is applied. High density polyethylene (HDPE) is an intermediate case. It has a high modulus and the elongation at break is 220%. Polyurethanes and their ionomers are far better than HDPE, most of them have strength on the order of ~20 Mpa while the elongation is greater than 400%.

Figure 7:
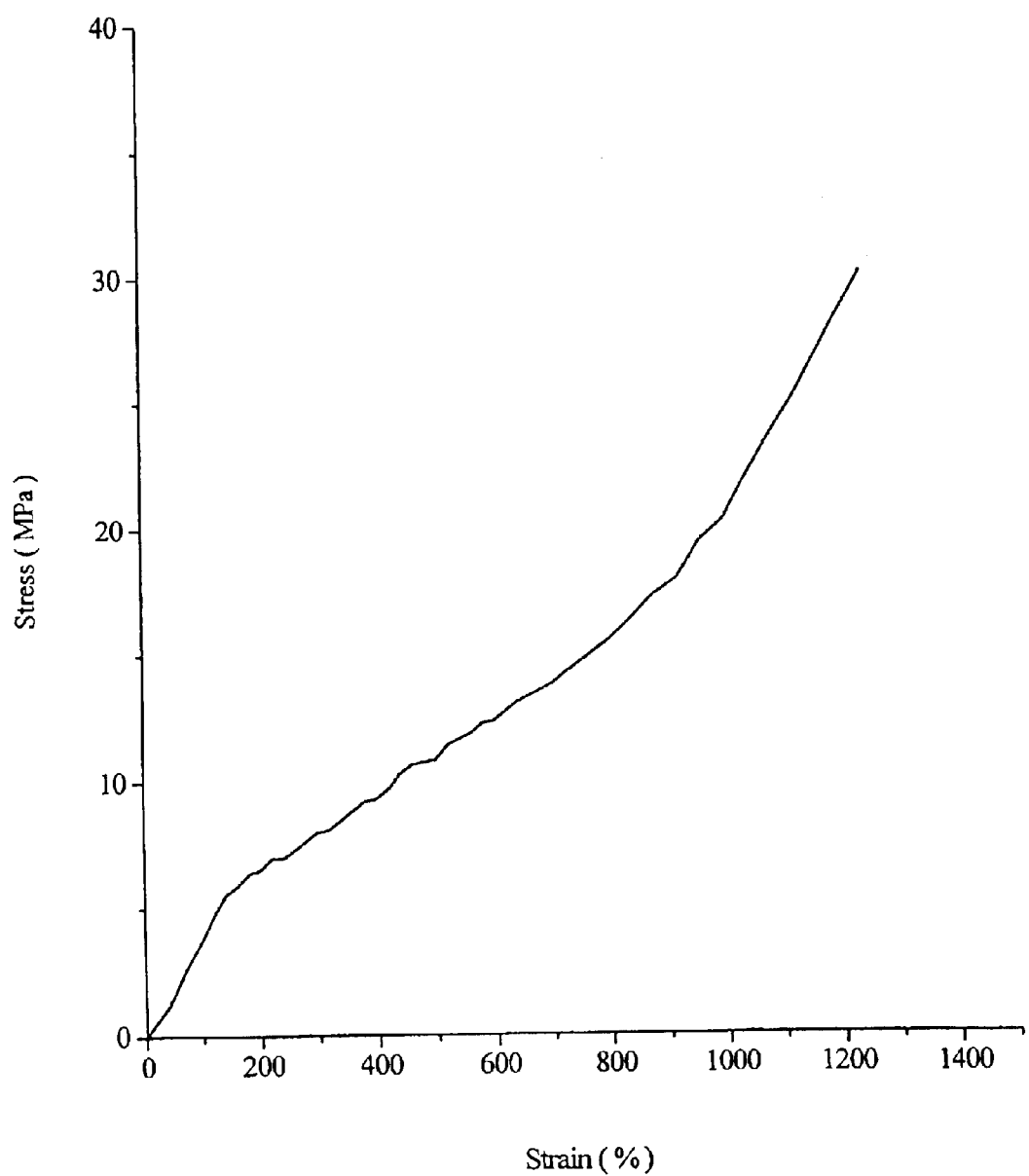
FIG. 7 is a chart which shows the stress strain properties of a sodium polyurethane ionomer, NaPUI-G, synthesized by the method of the invention based on HMDI, PTMO-2000 and sodium dimethylolpropionate. The strain was applied at 5 inches per minute.

The tensile strength of a polyurethane ionomer synthesized according to the invention (NaPUI-G) is shown in FIG. 7. The strain applied was 5 inches per minute.

The stress-strain curve B reported by Chen et al. shows that the polyurethane ionomer synthesized had an ultimate strength 16% stronger than the lower limit of the strength of the ionomer synthesized by using the method of the invention, but that the elongation at break of their material was only about 72% of the ionomer synthesized. The polyurethane ionomer synthesized by Xiao et al. had almost the same elongation at break as the ionomer synthesized here, but its strength at break was 48% lower. Studies show that PTMO-2000 based ionomers exhibit slightly higher tensile strength and modulus but lower elongation compared to PCL-2000 based ionomers. MDI based ionomers often have higher tensile strength and hardness but slightly lower elongation than ionomers based on HMDI. Overall, the method of the invention offers materials with superior stress-tensile properties.

Overall, the method of the invention yields clear ionomers with a wide applicable temperature range, high strength and elongation, while the standard method produces ionomers which are not optically clear in the visible spectral range, and which have narrower application temperature ranges. This cloudiness typically is associated with the presence of relatively large phases in inhomogeneous materials. The reasons that the standard method imposes limits on the physical properties are not fully understood, but it is possible to speculate. One reason could be that in some of the synthesis there are competing reactions, such as those between the isocyanates groups and the carboxylic acid groups that are not present or significant in the method of the invention. Another could be that the final reaction, that between the acid-form polyurethane and the metal ion source, is incomplete. Even if the stoichiometrically desired proportions of acid groups and metal containing molecules are combined in that reaction, the incomplete mixing, incomplete neutralization, and process-dependent formation of ion-containing entities must lead to a range of products that can be less than optimal for potential applications.

The method of the invention not only leads to polyurethane ionomers with superior mechanical properties, as discussed above, it also is a faster procedure. Since the two methods employ the same procedure to synthesize the prepolymer, the difference of reaction rates is attributable to the chain extension steps.

Consequently, the polyurethane ionomers (and blends thereof) produced by the method of the present invention exhibit improved properties over those produced by conventional methods. The DMTA measurement for some samples are presented in Tables 5–7, where it is shown that the polyurethane ionomers made by the method of this invention have ratios of E' that are less temperature dependent than those made by the First Established Method ("FEM"). From there it is clear in terms of the ratio of E' at low temperature (0 or −25° C.) to that at higher temperature (50 or 75° C.), and in terms of the value of Cs over either the most temperature-independent 50° C. range in the minus −25° C. to 75° C. region or throughout that region. This is further illustrated in Tables set forth below.

TABLE 5

A Property Comparison Table of Polyurethane Ionomers Showing That Polyurethane Ionomers Synthesized by the New Neutralization Method Have Less Temperature Dependence in Terms of Storage Modulus

| | | | E; (MPa) @ 1 Hz | | | | | |
|---|---|---|---|---|---|---|---|---|
| | Composition | Method | −25 (° C.) | 0 (° C.) | 50 (° C.) | 75 (° C.) | $E'_{0°C.}/E'_{50°C.}$ | $E'_{-25°C.}/E'_{75°C.}$ |
| Set A | NaPUI-A (FEM) | Ion exchange | 20 | 8.0 | 3.5 | 1.4 | 2.3 | 14 |
| | NaPUI-A | Prior Neutralization | 13 | 8.0 | 5.4 | 4.5 | 1.5 | 3 |
| | NaPUI-A | Prior Neutralization | 20 | 9.0 | 6.2 | 9.0 | 1.4 | 2 |
| Set B | ZnPUI-A(FEM) | Ion Exchange | 23 | 7.0 | 3.2 | 1.8 | 2.2 | 13 |
| | ZnPUI-A | Prior Neutralization | 43 | 38 | 38 | 34 | 1.0 | 1 |
| | ZnPUI-A | Prior Neutralization | 30 | 8.0 | 5.0 | 5.6 | 1.6 | 5 |
| | ZnPUI-A | Prior Neutralization | 24 | 8.4 | 6.2 | 5.6 | 1.4 | 4 |
| Set C | Zn(50)PUI-C(FEM) | Ion Exchange | 100 | 11 | 1.2 | 0.6 | 9.2 | 167 |
| | Zn(50)PUI-C | Prior Neutralization | 220 | 20 | 8.0 | 6.0 | 2.5 | 37 |
| Set D | Na(50)PUI-C | Ion Exchange | 80 | 12 | 2.0 | 1.1 | 6.0 | 73 |
| | Na(50)PUI-C | Prior Neutralization | 95 | 18 | 5.2 | 5.0 | 3.5 | 19 |

TABLE 6

Analysis of Some DMTA Data for the Definition of the Constant Slope

Range of the plateau and calculation of the Cs in the plateau temperature range

| Material Composition | Post-treated? | Using DMPA Salt? | Freq. (Hz) | T range (° C.) | ΔT (° C.) | logE' range | ΔE' ($10^6$ Pa) | $E'_{avg}$ ($10^6$ Pa) | *Cs (° C.$^{-1}$) × $10^3$ | rounded Cs (° C.$^{-1}$) × $10^3$ |
|---|---|---|---|---|---|---|---|---|---|---|
| ZnPUI-A | Yes | Yes | 0.1 | −34~+75 | 109 | 7.695~7.522 | 16.352 | 41.403 | 3.62 | 4 |
|  |  |  | 1 | −26~+75 | 101 | 7.681~7.553 | 12.246 | 41.850 | 2.90 | 3 |
|  |  |  | 10 | −18~≧+75 | ≧93 | 7.742~7.651 | 10.436 | 49.989 | 2.24 | 2 |
| CaPUI-A | Yes | Yes | 0.1 | −27~+49 | 76 | 7.063~6.786 | 5.700 | 8.711 | 8.61 | 9 |
|  |  |  | 1 | −21~+58 | 79 | 7.118~6.892 | 5.324 | 10.460 | 6.44 | 6 |
|  |  |  | 10 | −12~≧+75 | ≧87 | 7.111~6.918 | 4.633 | 10.596 | 5.02 | 5 |
| KPUI-A | Yes | Yes | 0.1 | −30~≧+60 | ≧90 | 7.278~7.016 | 8.592 | 14.671 | 6.51 | 7 |
|  |  |  | 1 | −23~≧+60 | ≧83 | 7.291~7.076 | 7.671 | 15.728 | 5.68 | 6 |
|  |  |  | 10 | −13~≧+60 | ≧73 | 7.188~7.011 | 5.160 | 12.837 | 5.51 | 6 |
| ZnPUI-A (N)*** | No | Yes | 0.1 | −27~+38 | 65 | 7.111~6.417 | 10.300 | 7.762 | 20.42 | 20 |
|  |  |  | 1 | −18~+43 | 61 | 7.062~6.660 | 6.964 | 8.053 | 14.18 | 14 |
|  |  |  | 10 | −9~+49 | 58 | 7.023~6.786 | 4.434 | 8.327 | 9.18 | 9 |
| ZnPUI-A (FEM) | No | No | 0.1 | −26~+27 | 53 | 7.116~6.656 | 8.533 | 8.759 | 18.3 | 18 |
|  |  |  | 1 | −18~+35 | 53 | 7.097~6.664 | 7.889 | 8.518 | 17.40 | 17 |
|  |  |  | 10 | −10~+47 | 57 | 7.082~6.711 | 6.938 | 8.609 | 14.14 | 14 |
| NaPUI-A(FEM) | No | No | 0.1 | −27~+26 | 53 | 7.120~6.574 | 9.433 | 8.466 | 21.02 | 21 |
|  |  |  | 1 | −122~+38 | 60 | 7.156~6.682 | 9.513 | 9.565 | 16.58 | 17 |
|  |  |  | 10 | −14~+50 | 64 | 7.151~6.754 | 8.482 | 9.917 | 13.36 | 13 |

Note:
*The corrected slope is defined as $$Cs = \frac{-\Delta E'}{\Delta T}\left(\frac{1}{E'_{avg.}}\right)$$

where E' is the store modulus in unit of Pa and T is temperature in unit of ° C.
**The DMTA data for this sample was collected from −150 to +60° C., so the listed slopes in the range of −20~+75° C. were obtained by extropolating the actually measured curves.
***Not post-treated

TABLE 7

| Material Code | Rounded Cs (° C.$^{-1}$ × $10^3$) | | | | | |
|---|---|---|---|---|---|---|
|  | Best 50° C. range in −20° C. to 75° C. | | | −20° C. to 75° C. | | |
|  | 0.1 Hz | 1 Hz | 10 Hz | 0.1 Hz | 1 Hz | 10 Hz |
| ZnPUI-A | 0 | 0 | 0 | 1 | 2 | 3 |
| CaPUI-A | 5 | 1 | 1 | 11 | 7 | 8 |
| KPUI-A | 5 | 3 | 2 | 6 | 5 | 7 |
| MgPUI-A | 8 | 4 | 3 | 10 | 10 | 13 |
| NaPUI-A | 9 | 4 | 1 | 11 | 4 | 1 |
| ZnPUI-A (N) | 18 | 9 | 5 | 17 | 16 | 16 |
| ZnPUI-A (FEM) | 11 | 13 | 9 | 17 | 16 | 16 |
| NaPUI-A (FEM) | 19 | 12 | 8 | 16 | 16 | 15 |
| Good If: | ≤10 | ≤8 | ≤4 | ≤14 | ≤14 | ≤14 |

TABLE 8

Compositions of Selected Examples of Polyurethane Ionomers Synthesized

| Code | PTMO Type | PTMO wt % | HMDI (wt %) | M-DMPA (wt %) 1st M-DMPA | 2nd M-DMPA |
|---|---|---|---|---|---|
| NaPUI-A | PTMO-1000 | 72.7 | 24.5 | 2.8 |  |
| ZnPUI-A | PTMO-1000 | 72.6 | 24.4 | 3.0 |  |
| NaPUI-B | PTMO-1000 | 68.9 | 26.5 | 4.6 |  |
| CaPUI-A | PTMO-1000 | 72.7 | 24.5 | 2.8 |  |

TABLE 8-continued

Compositions of Selected Examples of Polyurethane Ionomers Synthesized

| Code | PTMO Type | wt % | HMDI (wt %) | M-DMPA (wt %) 1st M-DMPA | 2nd M-DMPA |
|---|---|---|---|---|---|
| CsPUI-A | PTMO-1000 | 71.3 | 24.0 | 4.7 | |
| KPUI-A | PTMO-1000 | 72.5 | 24.4 | 3.1 | |
| BaPUI-A | PTMO-1000 | 72.1 | 24.3 | 3.6 | |
| SrPUI-A | PTMO-1000 | 72.4 | 24.4 | 3.2 | |
| LiPUI-A | PTMO-1000 | 72.9 | 24.5 | 2.6 | |
| LiPUI-A(FEM) | PTMO-1000 | 72.9 | 24.5 | 2.6 | |
| NaPUI-A(FEM) | PTMO-1000 | 72.7 | 24.5 | 2.8 | |
| KPUI-A(FEM) | PTMO-1000 | 72.5 | 24.4 | 3.1 | |
| CsPUI-A(FEM) | PTMO-1000 | 71.3 | 24.0 | 4.7 | |
| CaPUI-A(FEM) | PTMO-1000 | 72.7 | 24.5 | 2.8 | |
| HPUI-A | PTMO-1000 | 73.0 | 24.6 | 2.4 | |
| Na(50)Zn(50)PUI-A | PTMO-1000 | 72.6 | 24.4 | 1.4 | 1.5 |
| MgPUI-A | PTMO-1000 | 72.8 | 24.5 | 2.7 | |
| LiPUI-B | PTMO-1000 | 69.2 | 26.7 | 4.1 | |
| KPUI-B | PTMO-1000 | 68.6 | 26.4 | 5.0 | |
| K(50)Zn(50)PUI-C | PTMO-1000 | 64.0 | 28.7 | 3.7 | 3.5 |
| K(25)Zn(75)PUI-C | PTMO-1000 | 64.1 | 28.8 | 1.8 | 5.3 |
| K(75)Zn(25)PUI-C | PTMO-1000 | 64.0 | 28.7 | 5.5 | 1.8 |
| KPUI-C | PTMO-1000 | 64.0 | 28.7 | 7.3 | |
| ZnPUI-C | PTMO-1000 | 64.1 | 28.8 | 7.1 | |
| MgPUI-A(FEM) | PTMO-1000 | 72.8 | 24.5 | 2.7 | |
| BaPUI-A(FEM) | PTMO-1000 | 72.1 | 24.3 | 3.6 | |
| ZnPUI-A(FEM) | PTMO-1000 | 72.6 | 24.4 | 3.0 | |
| Na(50)Zn(50)PUI-B | PTMO-1000 | 68.8 | 26.5 | 2.3 | 2.4 |
| Na(50)Zn(50)PUI-C | PTMO-1000 | 64.3 | 28.8 | 3.3 | 3.6 |
| Na(35)Zn(65)PUI-C | PTMO-1000 | 64.2 | 28.8 | 2.4 | 4.6 |
| Na(33)Zn(67)PUI-B | PTMO-1000 | 68.8 | 26.4 | 1.5 | 3.3 |
| Zn(50)PUI-C(FEM) | PTMO-1000 | 64.6 | 29.0 | 3.6 | 2.8 (DMPA) |
| Na(50)PUI-C(FEM) | PTMO-1000 | 64.7 | 29.0 | 3.4 | 2.9 (DMPA) |
| Ca(50)PUI-C(FEM) | PTMO-1000 | 64.7 | 29.0 | 3.3 | 2.9 (DMPA) |
| Mg(50)PUI-C(FEM) | PTMO-1000 | 64.9 | 29.1 | 3.1 | 2.9 (DMPA) |
| Ba(50)PUI-C(FEM) | PTMO-1000 | 64.1 | 28.7 | 4.3 | 2.9 (DMPA) |
| RbPUI-A | PTMO-1000 | 71.9 | 24.2 | 3.9 | |
| NaPUI-C | PTMO-1000 | 64.4 | 28.9 | 6.7 | |
| ZnPUI-I | PTMO-2000 | 78.1 | 17.5 | 4.3 | |
| ZnPUI-G | PTMO-2000 | 84.1 | 14.2 | 1.7 | |
| ZnPUI-H | PTMO-2000 | 82.5 | 14.8 | 2.7 | |
| NaPUI-D | PTMO-1000 | 59.6 | 32.1 | 8.3 | |
| NaPUI-E | PTMO-1000 | 52.4 | 35.3 | 12.3 | |
| NaPUI-F | PTMO-1000 | 44.2 | 39.7 | 16.1 | |
| NaPUI-H | PTMO-2000 | 82.6 | 14.8 | 2.6 | |
| NaPUI-G | PTMO-2000 | 84.2 | 14.2 | 1.6 | |
| NaPUI-I | PTMO-2000 | 78.3 | 17.6 | 4.1 | |
| NaPUI-L | PTMO-2000 | 61.3 | 27.5 | 11.2 | |
| NaPUI-K | PTMO-2000 | 68.8 | 23.2 | 8.0 | |
| NaPUI-J | PTMO-2000 | 74.2 | 20.0 | 5.8 | |
| LiPUI-F | PTMO-1000 | 45.0 | 40.4 | 14.6 | |
| LiPUI-D | PTMO-1000 | 59.6 | 32.1 | 8.3 | |
| NiPUI-A | PTMO-1000 | 72.6 | 24.5 | 2.9 | |
| ZnPUI-M | PTMO-2900 | 88.4 | 10.3 | 1.3 | |
| NaPUI-N | PTMO-2900 | 86.5 | 11.5 | 2.0 | |

Blending the Polyurethane Ionomers Produced by the Process of the Present Invention with Various Polymers 1. Mixing/Blending Polyurethane Ionomers with Their Parent Polymers—TPUs Materials Polyurethane ionomers (PUIs) based on HMDI, PTMO-1000 and corresponding metal dimethylolpropionate with various ionic concentrations were synthesized by the new method described above. The PUIs used had compositions Na20PU420, Na40PU440, Zn20PU420, Zn40PU440, and Na20Zn20PU440, where Na means an sodium ionomer, Zn means an zinc ionomer, and the numbers after Na or Zn mean the molar fraction of HMDI reacted with the metal dimethylolpropionate when synthesized. Three commercial thermal plastic polyurethanes were mixed with the PUIs. One is Bayer, Inc. DP7-3006, shorthand DP. It is an aliphatic polyether thermoplastic polyurethane. Texin® 285, abbreviated as TX, is a Bayer, Inc. aromatic polyester-based TPU.

Merquinsa® D15N85, referred to as DN, is a polyether copolymer-based TPU.

Solution Blending

Weighed amounts of PUI and TPU were dissolved in a mixed solvent of DMF and THF (3:1, v/v) to form a clear solution under stirring. This solution was cast on a Teflon® piece to evaporate the solvents at around 75° C. Residual solvents were removed in vacuo at 100° C.

Extrusion Blending

Weighed amounts of PUI and TPU were extruded on a twin-screw extruder with the barrel temperature of 185° C. They produced mixtures/blends of the compositions listed below.

2. Blending Polyurethane Ionomers with Sulfonated Polystyrene

Materials

Zinc polyurethane ionomer with the composition of Zn20PU420, was synthesized according to the new method described above. Sulfonated polystyrene with a 6.9% molar sulfonation was provided by Dr. Robert Lundberg of Exxon Inc., and was designated as SPS6.9.

Solution Blending

PUI and SPS6.9 were dissolved in DMF at 60° C. according to the ratio in Table 10 (see below) under stirring to form clear solutions. Then this solution was cast at 60° C. to form a film, which was further dried in vacuo at 60° C. for 24 hours to remove residual solvent.

3. Blending Polyurethane Ionomer with Ethylene-Acrylate Copolymer

Materials

Zinc polyurethane ionomer with the composition of Zn20PU420, was synthesized according to the new method describe above. Poly(ethylene-co-acrylic acid) with acrylic acid monomer molar fraction of 20%, Primacor® 5990, was used as received from Dow, Inc.

Solution Blending

Polyurethane ionomer and Primacor were mixed according to the ratio listed in Table 11 (below) in a mixture solvent of DMF and THF at a volume ratio of 2:1 at 60° C. The resultant solution was cast at 60° C. to form a film, which was dried further in vacuo at 60° C. for 12 hours to remove residual solvents.

4. Blending Polyurethane Ionomer with Poly(ethylene-methacrylic Acid) Ionomers

Materials

Zinc and sodium polyurethane ionomer with the compositions of Zn20PU420, Na20PU420 and Na25PU525 were synthesized according to the new method described above. Surlyn® 9650 and Surlyn® 8660 thermoplastic resins from DuPont were dried at 60° C. overnight. Surlyn® is a trademark of DuPont's poly(ethylene-co-methacrylic acid) (E/MAA) ionomers, in which the MAA acid groups have been partially neutralized with zinc ions for Surlyn® 9650 and with sodium ions for Surlyn® 8660.

Blending

All blends were made in a Banbury Mixer with cooling water on all the time. Surlyn® was added first and melted, and then the required amount of PUI (according to Table 12) was added and the two were mixed for 10 minutes at the maximum mixing speed of the machine with the ram down.

Results and Discussions

1. Blends of Polyurethane Ionomers with Thermoplastic Polyurethanes

Various PUIs were blended with a variety of TPUs. The blends made of polyurethane ionomers (PUIs) and thermoplastic polyurethanes (TPUs) were listed in Table 9. All blends appeared homogeneous because they were clear to unaided eyes. This indicated that PUIs are compatible with various thermoplastic polyurethanes. This is a good result, since PUIs themselves are special TPUs. The polymer chains of one of these PUIs and a TPU are very similar. Because this is a straightforward result, no further investigation was conducted on the blends of PUIs and TPUs.

TABLE 9

Parameters of blends of PUIs with TPUs

| Code | TPU Name | Amount (wt %) | PUI Name | Amount (wt %) | Method |
|---|---|---|---|---|---|
| N20PUI/95% DP | DP | 95 | Na20PU420 | 5 | SB |
| N20PUI/95% TX | TX | 95 | Na20PU420 | 5 | SB |
| N20PUI/95% DP | DP | 95 | Na20PU420 | 5 | SB |
| N20PUI/90% DP | DP | 90 | Na20PU420 | 10 | SB |
| Na40PUI/95% DP | DP | 95 | Na40PU440 | 5 | SB |
| N40PUI/90% DP | DP | 90 | Na40PU420 | 10 | SB |
| Z20PUI/95% DP | DP | 95 | Zn20PU420 | 5 | SB |
| Z20PUI/90% DP | DP | 90 | Zn20PU420 | 10 | SB |
| Z40PUI/95% DP | DP | 95 | Zn40PU440 | 5 | SB |
| N20PUI/95DN | DN | 95 | Na20PU420 | 5 | EB |
| N40PUI/95DN | DN | 95 | Na40PU440 | 5 | EB |
| Z20PUI/95% DN | DN | 95 | Zn20PU420 | 5 | EB |
| Z40PUI/95% DN | DN | 95 | Zn40PU440 | 5 | EB |
| NZ40PUI/95% DN | DN | 95 | Na20-Zn20PU440 | 5 | EB |

Note:
SB-Solution Blending
EB-Extrusion Blending

2. Blends of Polyurethane Ionomers with Sulfonated Polystyrene

Blends of zinc polyurethane ionomer with the composition of Zn20PU420 with sulfonated polystyrene were prepared at the ratios as listed in Table 10.

Films of the bends appeared homogeneous to unaided eyes, suggesting that these two components are compatible at least on the scale of less than 0.8 $\mu$m, because cloudiness would be seen if there were scattering due to larger microphases.

TABLE 10

Composition of blends of Zn20PU420 with SPS6.9

| Code | PUI Content (wt %) |
|---|---|
| ZPUI-95% SPS | 5 |
| ZPUI-90% SPS | 10 |
| ZPUI-84% SPS | 16 |

The compatibility of these two materials was investigated further by employing infrared spectroscopy. In FIG. 8 and FIG. 9, A is the spectrum of the zinc polyurethane ionomer, when 95% (wt %) SPS6.9 is blended in, the spectrum of the yielded blend is shown as spectrum D; when the concentration of PUI in a blend increases to 10% (wt %), the spectrum of the product is shown as C; when 16% (wt %) PUI is blended with 84% (wt %) SPS6.9, the product had the spectrum B; and finally the spectrum of pure SPS6.9 is shown as E in the figure.

The spectra in the 1800 to 1480 $cm^{-1}$ region, the spectra are shown in FIG. 8. There are three major bands (Spectrum A in FIG. 8) for the polyurethane ionomer. The strong broad band centered at 1720 $cm^{-1}$ with a strong shoulder at 1700 $cm^{-1}$ is due to free and bonded C=O stretching, the band located at about 1620 $cm^{-1}$ is assigned to the $COO^-$ groups, and the medium strong band at 1528 $cm^{-1}$ is due to the bending mode of N—H groups of urethane linkages.

In this region, there are also three bands for the sulfonated polystyrene (See spectrum E of FIG. 8), a strong band at 1500 cm$^{-1}$, a weak one at 1580 cm$^{-1}$ and a medium peak at 1600 cm$^{-1}$. These three bands, together with other very weak bands in this region, are due to the skeletal vibrations of benzene rings. These three bands do not change much upon blending and show up in the spectra of all three blends (See Spectra B, D and D in FIG. 8).

Figure 17:
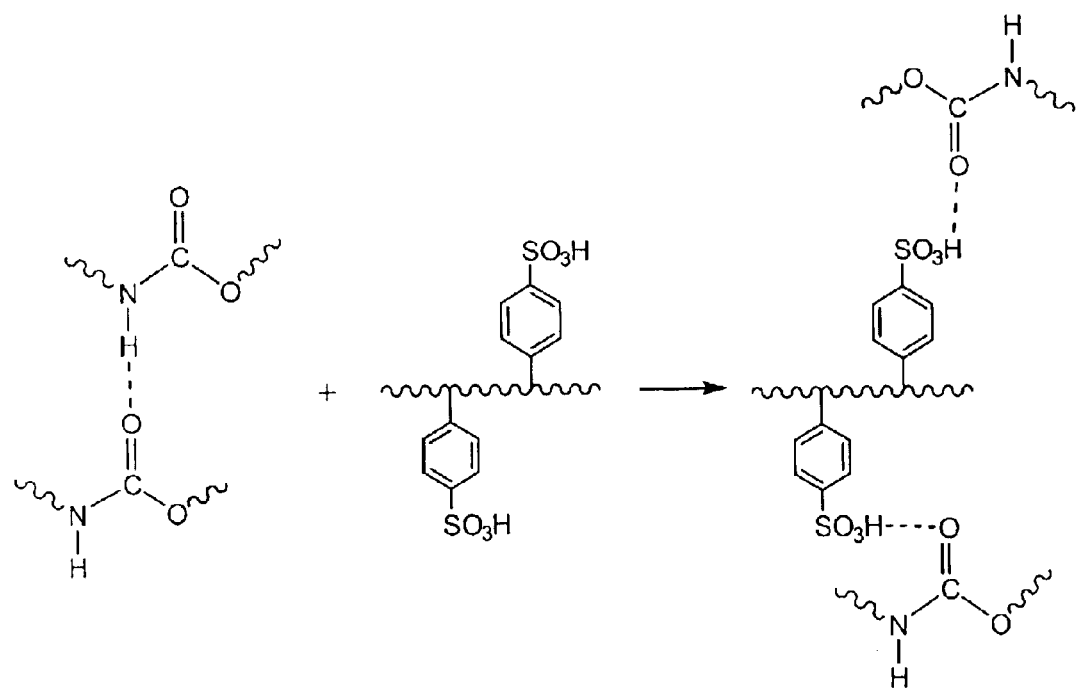
FIG. 17 shows hydrogen bonding between sulfonic acid and urethane linkages.

A very noticeable band in the three blends is the one located at 1670 cm$^{-1}$ with medium intensity, whose relative intensity increases as the concentration of SPS in the blend increases. This band does not appear in the PUI spectrum, nor is it present in the SPS spectrum. This strongly indicates that a new species resulted from blending of SPS and PUI molecules. This band can be deconvoluted from the broad band of $v_{C=O}$, and is assigned to hydrogen bonded C=O with N—H groups in high order. The more the $v_{C=O}$ shifts from the free unbonded form to hydrogen bonded form, the stronger the hydrogen bonding. Therefore, the band at 1670 cm$^{-1}$ of the blends is assigned to protonated carbonyls of urethane linkages by sulfonic acid through hydrogen bonding as shown in FIG. 17. The replacement of the hydrogen bonding between a urethane linkage and a urethane linkage by one between a urethane linkage and a sulfonic acid group occurs because sulfonic acid is a strong proton acid, thus a stronger proton donor than a urethane linkage. Due to the strongly acidic nature of sulfonic acid, it not only protonates C=O of urethane linkages, also it protonates the secondary amine of urethane linkages, leading to the formation of quaternary ammonium cation associated with the sulfonate.

The coupled $V_{C—N}$ and $\delta_{N—H}$ vibrations, appear at 1528 cm$^{-1}$ for the polyurethane ionomer shifts progressively to 1540 cm$^{-1}$ when the concentration of SPS6.9 increases to 95% as relatively more N—H groups are protonated. This proton transfer has been reported in the literature for the blends of tertiary amine-containing-polyurethane with sulfonated polystyrene [Rutkowska, M. and Eisenberg, A., *Macromolecules*, 17, 821 (1984); Eisenberg, A, Smith, P., and.Zhou, Z. L., *Polym. Eng. Sci.*, 22, 1117 (1982)] and for the blends in which one component carried a sulfonic acid and the other a vinylpyridine group [Smith, P. and Eisenberg, A., *J. Polym. Sci. Polym. Lett. Ed.*, 21, 223 (1983)].

The spectra in the 1300 to 1000 cm$^{-1}$ region are interesting because of the presence of asymmetric and symmetric stretching vibrations of the sulfonate anion, the presence of the skeletal vibrations of the aromatic rings at 1135 to and 1028 cm$^{-1}$, and the presence of the vibrations of the C—O, C—N and —CH$_2$— groups of the polyurethane. The spectra in this region for the starting materials and the blends are shown in FIG. 9. The two peaks centered at 1195 and 1180 cm$^{-1}$ are consistent with the asymmetric SO$_3^-$ stretching vibration for SPS ionomers which appears in the range of 1175 to 1250 cm$^{-1}$ [X. Lu and R. A. Weiss, *Macromolecules*, 24, 4381 (1991); X. Lu and R. A. Weiss, *Macromolecules*, 25, 6185 (1992); P. Rajagopalan, J.-S. Kim, H. Peter-Brack, X. Lu, A. Eisenberg, R. A. Weiss, and W. M. Risen, Jr., *J. Polym. Sci.: Part B: Polym. Phys.*, 33, 495 (1995).]. This suggests that the —SO$_3$H groups of SPS are almost in their anion form.

The isolated sulfonate anion would have local C$_{3v}$ symmetry, and its symmetric stretching vibration is doubly degenerate. When it is protonated, the symmetry is lowered and thus the band at 1180 cm$^{-1}$ is split into one at 1180 cm$^{-1}$ and one at 1174 cm$^{-1}$. The overall band feature is broad in this region as shown by spectrum E of FIG. 9. Spectrum E also has a peak at 1100 cm$^{-1}$, due to the symmetric vibrations of the "dry" form of SO$_3$H resulting from the in-plane skeletal vibrations of a disubstituted benzene ring [J. J. Fitzgerald and R. A. Weiss, *Coulombic Interactions in Macromolecular Systems*, A. Eisenberg and F. E. Bailey, Eds., ACS Symposium Series, 302, 35 (1986)]. This peak disappears in the spectra of the blends, agreeing with the conclusion made above. The symmetric vibration of —SO$_3^-$ of hydrogen form SPS, resulting from partial dissociation of the —SO$_3$H, has a broad band centered at 1067 cm$^{-1}$ with a higher frequency shoulder. When SPS is blended with PUI, this broad band becomes weaker in the blends and also two new bands appear in the spectra of the blends, one at 1035 cm$^{-1}$ comprising a shoulder at 1028 cm$^{-1}$ and one at 1012 cm$^{-1}$. These two new bands in the blend are split and shifted from the broad band of the SPS. When SPS is blend with PUI, —SO$_3^-$ groups are produced by removal of protons of sulfonic acid through protonation of carbonyl and secondary amine groups of urethane linkages, therefore splitting and shifting the —SO$_3$H symmetric vibration band. The shoulder at 1028 cm$^{-1}$ of the band at 1035 cm$^{-1}$ is due to the SPS benzene ring skeletal vibration. Interestingly, the peak at 1245 cm$^{-1}$ of the PUI, due to a combination of the vibration of C—O and the wagging motion of methylene groups of soft segments, weakens when 86% of SPS is blended and it almost disappears when in the blend of 95% of SPS. More interestingly, the strong stretching vibration of C—O—C of soft segments splits into two bands, a weak one at 1112 cm$^{-1}$ and a strong one at 1125 cm$^{-1}$. The split weak band become weaker and weaker as the concentration of SPS of the blend increases. This phenomenon strongly suggests that the sulfonic acid groups interact with the soft segment, perturbing its vibrational band. This interaction is assigned as the protonation of the ether linkages of soft segments by the sulfonic acid groups 3. Blends of Polyurethane Ionomer with Poly(ethylene-co-acrylic Acid)

Blends of zinc polyurethane ionomer with the composition of Zn20PU420 with Primacor-5990, a poly(ethylene-co-acrylic acid) (PEAA) with acrylic acid molar fraction of 20%, were prepared at the blending ratios listed in Table 11. Films of the bends were homogeneous to unaided eyes, so these two compounds are miscible to at least some extent.

Figure 18:
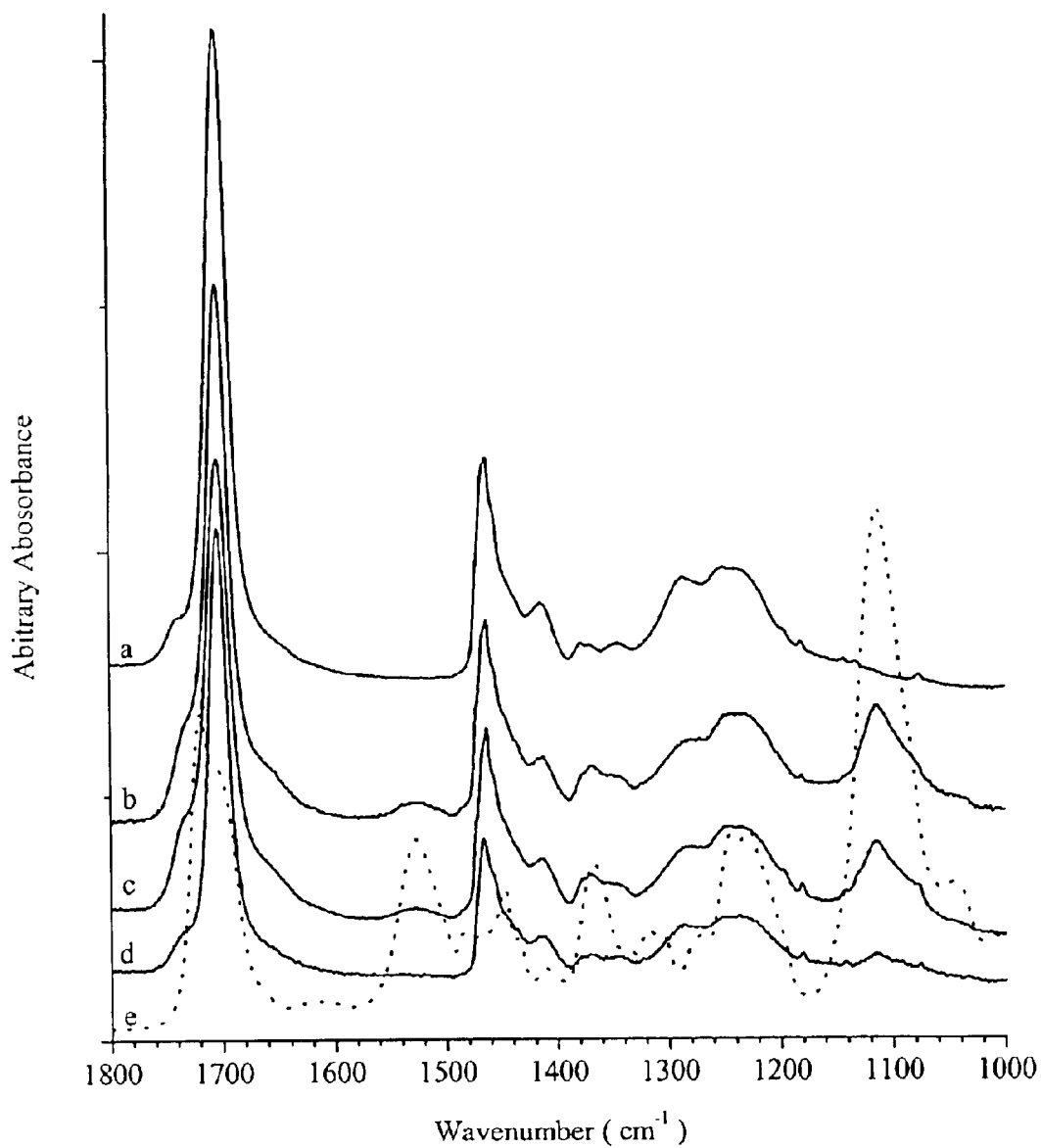
FIG. 18 is an FT-IR spectra of zinc polyurethane ionomer Zn20PU420, PEAA and their blends. (a) Zn20PU420; (b) ZnPUI-83%PEEA; (c) ZnPUI-90%PEEA; (d) ZnPUI-95%PEEA; and (e) PEEA.

The infrared spectra of the starting materials, Zn20PU420 and PEAA, are shown as spectrum A and E, respectively, in FIG. 18. The spectrum of their blends are shown as B for the 83% PEAA blend, C for the 90% PEAA blend, and D for the 95% PEAA blend.

TABLE 11

Composition of blends of Zn20PU420 with Primacor 5990

| Code | PUI Content (wt %) |
|---|---|
| ZPUI-95% PEAA | 5 |
| ZPUI-90% PEAA | 10 |
| ZPUI-83% PEAA | 17 |

The shoulder at 1680 cm$^{-1}$ of the peak at 1700 cm$^{-1}$ of the blends suggests that the carboxylic acid groups of PEAA interact with the hard segment of the polyurethane ionomer. Also, a careful examination of the spectra of blends and PUI in the region of 1150 to 1050 cm$^{-1}$ can see the broadening of the stretching band of C—O—C of soft segments, which reveals a perturbation of the soft phase. Overall, the interaction between carboxylic acid groups of PEAA and urethane and ether linkages of PUI leads to the miscibility of PEEA and PUI.

4. Blends of Polyurethane Ionomer with Poly(ethylene-co-methacrylic Acid) Ionomers

TABLE 12

Compositions of blends of PUIs with Surlyn ® 9650 and 8660

| Code | Surlyn Name | Amount (wt %) | PUI Name | Amount (wt %) |
|---|---|---|---|---|
| Z20PUI/91% S9 | Surlyn ® 9650 | 91 | Zn20PU420 | 9 |
| Z20PUI/85% S9 | Surlyn ® 9650 | 85 | Zn20PU420 | 15 |
| Z20PUI/75% S9 | Surlyn ® 9650 | 75 | Zn20PU420 | 25 |
| Z20PUI/68% S9 | Surlyn ® 9650 | 68 | Zn20PU420 | 32 |
| N25PUI/91% S9 | Surlyn ® 9650 | 91 | Na25PU525 | 9 |
| N25PUI/85% S9 | Surlyn ® 9650 | 85 | Na25PU525 | 15 |
| N25PUI/75% S9 | Surlyn ® 9650 | 75 | Na25PU525 | 25 |
| N25PUI/68% S9 | Surlyn ® 9650 | 68 | Na25PU525 | 32 |
| N20PUI/91% S9 | Surlyn ® 8660 | 91 | Na20PU420 | 9 |
| N20PUI/85% S9 | Surlyn ® 8660 | 85 | Na20PU420 | 15 |
| N20PUI/75% S9 | Surlyn ® 8660 | 75 | Na20PU420 | 25 |
| N20PUI/68% S9 | Surlyn ® 8660 | 68 | Na20PU420 | 32 |

Blends of polyurethane ionomers with two types of poly(ethylene-co-methacrylic acid) were prepared with various PUI concentrations as listed in Table 12.

The first series of blends studied resulted from combining a zinc polyurethane ionomer and a poly(ethylene-co-methacrylic acid) what was partially neutralized with zinc cations at various PUI concentrations. The infrared spectra of the starting materials and the blends are shown in FIG. 12 in the region of 1160 to 1760 cm$^{-1}$. The $v_{COO^-}$ of the zinc carboxylate of the PUI is a broad band centered at 1620 cm$^{-1}$, while it shows up as two bands in the spectrum of Surlyn® 9650, one weak band at 1620 cm$^{-1}$ and a strong one at 1585 cm$^{-1}$. Interestingly, the intensity of the band at 1620 cm$^{-1}$ of the blend increases as the PUI content of the blend increases, at the same time it becomes sharper than it is in PUI form. This suggests that ionic groups of Surlyn® interact with the ionomer groups of PUI to form a more ordered structure. This interaction of the ionic groups of Surlyn® with hard domains of the PUI is confirmed also further by examining the changes of the two peaks at 1245 and 1228 cm$^{-1}$ of the PUI after it is blended with Surlyn® 9650. The two bands are due to C—O and C—N stretching coupled with bending motions and they are two distinct bands in the case of pure PUI (See spectrum F of FIG. 12). When PUI is blended with Surlyn® 9650, the feature is smeared and a broad band shows up instead of two separated ones, indicating that a perturbation of the hard segment occurs.

Figure 19:
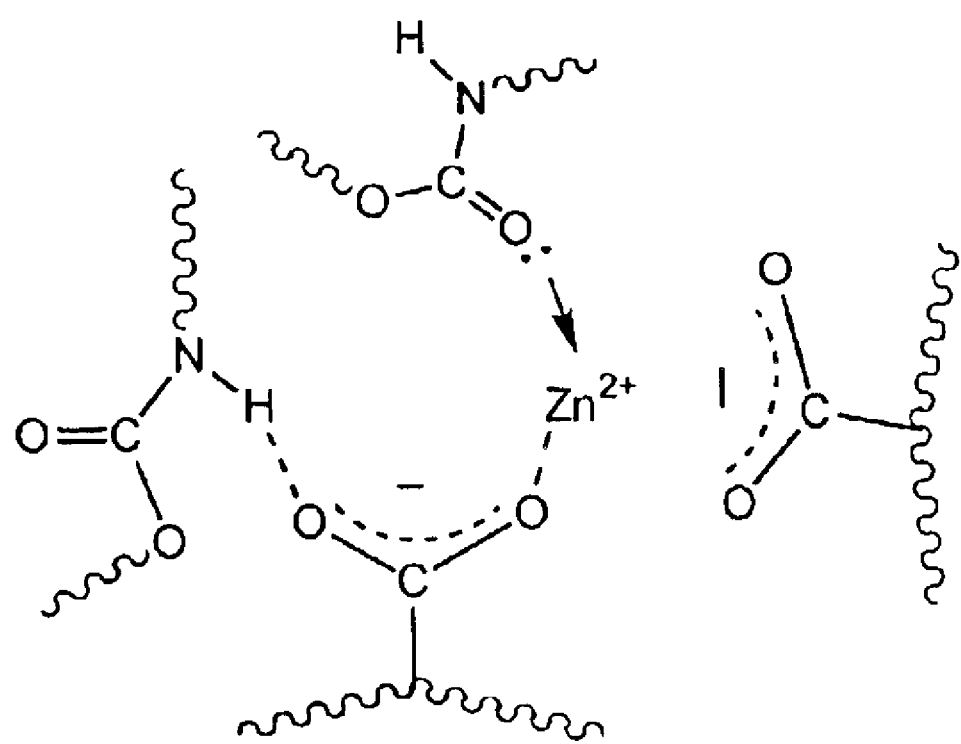
FIG. 19 is a schematic representation showing the bridging between urethane linkage carboxylate anion and the coordination of $Zn^{2+}$ cation to carbonyl of urethane linkages; and, FIG. 20 is a schematic representation of local structures of metal carboxylate (A) tetracoordinated and (B) hexacoordinated structure.

Far infrared spectroscopy is sensitive to the chemical environment changes of metal cations and it is a useful tool to characterize molecular interactions of ionomers. The far IR spectra of the PUI, Surlyn® 9650 and their blends are presented in FIG. 11 in the range of 80 to 630 cm$^{-1}$. The peak at 530 cm$^{-1}$ is the dominant feature of the spectrum of Surlyn® 9650. However, it is significantly suppressed in the blends. Instead, in the blends, a band at 441 cm$^{-1}$, which is a weak band in the case of pure Surlyn® 9650, becomes the dominant feature of the spectra. The origin of the 530 cm$^{-1}$ band is not completely clear; however Stoilova et al. [D. Stoilova, G. S. Nikolov, and C. Balarev, *Izv. Khim.*, 9, 371 (1976).] explored IR spectra of several metal (II) acetate hydrates and assigned the peak observed at ~530 cm$^{-1}$ to out-of-plane COO$^-$ bending vibrations. They pointed out that this peak is absent if the acetate ligand is bridged or substantially reduced for bidentate acetate ligands. Their criterion and the present observations on Z20PUI/Surlyn® 9650 blends lead to the conclusion that some of the carboxylate anions are in the bridging modes such as the one shown in FIG. 19.

The bands at 250 and 142 cm$^{-1}$ of the zinc Surlyn® 9650 are due to the vibrational modes of Zn$^{2+}$ ions incorporated in the ionic aggregates and of isolated Zn$^{2+}$ ions, respectively [K. Tsunashima, S. Kutsumizu, E. Hirasawa, and S. Yano, *Macromolecules*, 24, 5910 (1991); S. Kutsumizu, H. Hisaaki, H. Tachina, K. Shimabayashi, and S. Yano, *Macromolecules*, 32, 6340 (1999).]. The band at 250 cm$^{-1}$ clearly shifts to 268 cm$^{-1}$, agreeing with the conclusion reached above that the Zn$^{2+}$ interacts with polyurethane ionomers.

The second series of blends that were examined were from a sodium polyurethane ionomer with the composition of Na25PU525, abbreviated as N25PUI, with the same zinc Surlyn® 9650 at various PUI concentrations. Their far infrared spectra are shown in FIG. 12 as spectrum B, C, D and E for the blends containing N25PUI of 9%, 15%, 25%, and 32% (wt %). The spectrum of N25PUI is shown as spectrum F and that for Surlyn® 9650 is spectrum A. Again, the feature of the spectra in the range of 380 to 580 cm$^{-1}$ discussed above for the blends of Z20PUI and Surlyn® 9650 is observed here. This is expected since both series of blends are from Surlyn® 9650 and a specific PUI. Because the cations of the PUIs for the two series of blends are different, there do exist differences between the spectra. This can be seen by examining the spectra in the range of 180 to 360 cm$^{-1}$, where the ion motion band of Na$^+$ relative to carboxylate anion occurs [A. T. Tsatsas and W. M. Risen, Jr., *Chem. Phys. Lett.*, 7, 354 (1970); A. T. Tsatsas, J. W. Reed and W. M. Risen, Jr., *J. Chem. Phys.*, 55, 3260 (1971); G. B. Rouse, W. M. Risen, Jr., A. T. Tsatsas, and A. Eisenberg, *J. Polym. Sci. Polym. Phys. Ed.*, 17, 81 (1979); V. D. Mattera and W. M. Risen, Jr., *J. Polym. Sci. Polym. Phys. Ed.*, 22, 67 (1984)]. The spectra of the blends of N25PUI/Surlyn® 9650 have a much broad band in this region with several peaks, indicating that there exist bridged species, e.g., of the form of —COO$^-$ Na$^+$ . . . OCO$^-$Zn$^{2+}_{1/2}$ [S. Kutsumizu, H. Hisaaki, H. Tachina, K. Shimabayashi, and S. Yano, *Macromolecules*, 32, 6340 (1999)]. The formation of this bridged species also increases the polarity of both sodium carboxylate and zinc carboxylate, consistent with the increase of intensity of the band in this region. And also, this bridging effect should be partly due to the disappearance of the peak at 530 cm$^{-1}$ as discussed above.

The dynamical mechanical properties of polyurethane ionomers blended in this series were investigated. The measured loss tangent was plotted vs. temperature in FIG. 13. The sodium polyurethane ionomer has a glass transition at −52° C., and the zinc Surlyn® does not have a transition in the temperature range of −80 to −20° C., but the blends have a glass transition at −68° C. Meanwhile, the transition of the blends at 3° C. is stronger than the corresponding one of the zinc Surlyn®. This trend was observed in the series of sodium polyurethane ionomers with various ionic concentrations, where it was interpreted that the increase of ionic concentration increases the phase separation between hard and soft segment. Therefore, this result is supportive of the conclusion that the carboxylate of Surlyn® interacts with urethane linkages as if they were ionic sites of polyurethane molecules.

The final series of blends studied comprised a sodium polyurethane ionomer and a sodium Surlyn® 8660. Their infrared spectra are presented in FIG. 14. The sodium Surlyn® 8660 has two bands, a weak one at 210 and a stronger one at 248 $cm^{-1}$, associated with sodium ion motion relative to carboxylate anion with different environments, and it also has the two bands at 441 and 530 $cm^{-1}$ as the zinc Surlyn® does. The sodium polyurethane ionomer has a strong peak at 162 $cm^{-1}$ with a broad shoulder at 220 $cm^{-1}$ due to $Na^+$ motions. The 162 $cm^{-1}$ dominates the spectra of the polyurethane ionomer while the 441 $cm^{-1}$ being the strongest band of the sodium Surlyn® 8660. However, the peak at 220 $cm^{-1}$ is the prominent feature of the spectrum of the blend with two new bands appearing at 321 and 388 $cm^{-1}$. At the same time, the main feature of the spectrum of the sodium Surlyn, the band at 441 $cm^{-1}$, disappears, and the band at 530 $cm^{-1}$ broadens by adding a band at 560 $cm^{-1}$.

Figure 20:
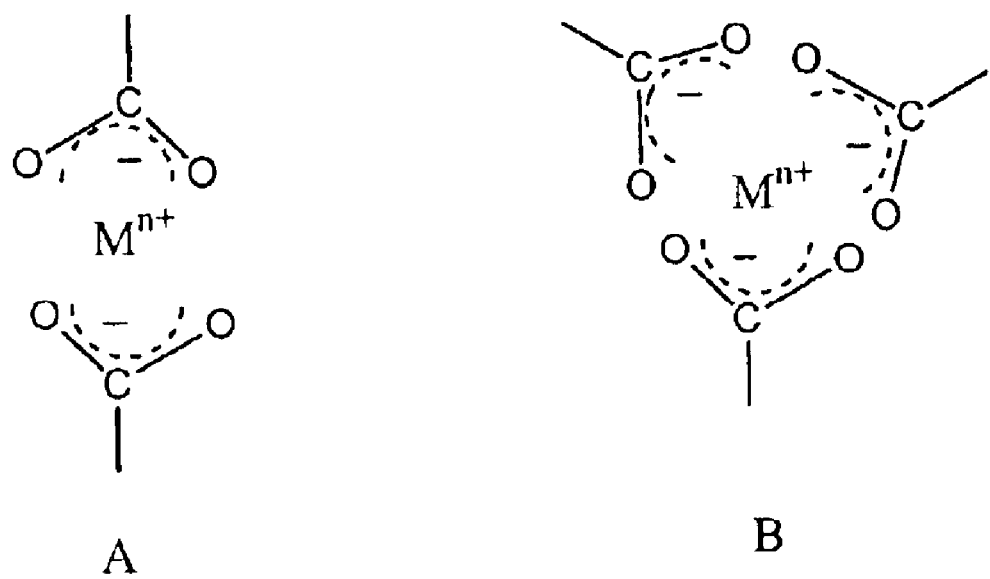

The band at 441 $cm^{-1}$ is not clearly assigned to a specific species. Tsunashima et al. [K. Tsunashima, S. Kutsumizu, E. Hirasawa, and S. Yano, *Macromolecules*, 24, 5910 (1991)] tentatively assigned it to C—C—C skeleton vibrations; however that assignment is not very convincing, since this peak was absent in the spectra of their acid form poly (ethylene-co-methacrylic acid). Nakamoto [K. Nakamoto, *Infrared Spectra of Inorganic and Coordination Compounds*, Johnson & Wiley Inc., London, (1963)] explored the far IR spectra of metal oxalates and assigned the peak at 436 $cm^{-1}$ to the δ ($^-$OC=O) coupled with ring deformation. Instead of specifying the nature of this band, it is left open to further investigation. It is clear that this peak is associated with a metal carboxylate group since it is present when there is a metal cation associated with the carboxylate (See spectrum A in FIGS. 4.6, 4.7, and 4.10) and it is absent when the cation is replaced by protons [K. Tsunashima, S. Kutsumizu, E. Hirasawa, and S. Yano, *Macromolecules*, 24, 5910 (1991)]. Both sodium and zinc form Surlyn® have ionic aggregates [F. C. Wilson, R. Longworth, and D. Vaughan, *J. Polym. Prepr. Am. Chem. Soc. Div. Polm. Chem.*, 9, 505 (1968); R. Longworth, and D. J. Vaughan, *Nature*, 218, 85 (1968); S. Bonotto, and E. F. Bonner, *Macromolecules*, 1, 510 (1982); W. J. MacKnight, L. W. McKenna, and B. E. Read, *J. Appl. Phys.*, 38, 4208 (1967); E. P. Otocka and D. D. Davis, *Macromolecules*, 2, 437 (1969); J. Yamauchi, and S. Yano, *Macromolecules*, 15, 210 (1982); S. Yano, N. Nagao, M. Hattori, E. Hirasawa, and K. Tadano, *Macromolecules*, 25, 368 (1992); H. Tachino, H. Hara, E. Hirasawa, S. Kutsumizu, K. Tadano, and S. Yano, *Macromolecules*, 26, 752 (1993)]. And in aggregates, it is shown [M. M. Coleman, J. Y. Lee, and P. C. Painter, *Macromolecules*, 23, 2339 (1990); B. A. Brozoski, M. M. Coleman, and P. C. Painter, *Macromolecules*, 17, 230 (1984)] that the zinc cations are either tetra-coordinated or hexa-coordinated while the sodium cations are hexa-coordinated as shown in FIG. 20. In observance of Nakomota's assignment, it is proposed that the 441 $cm^{-1}$ peak results from the deformation of $COO^-$ groups in one of the above ring forms. Solvation of zinc cations by the polyurethane chains or hydrogen bonding between carboxylate anions and urethane linkages does not destroy the coordination structure of zinc. However, due to the weak coordination ability of sodium cations, the local structure of sodium carboxylate can be disrupted by "salvation" when blended with the polyurethane ionomer. This forms lowered coordinated sodium carboxylate and leads to the disappearance of this peak.

CONCLUSIONS

Polyurethane ionomers are miscible with thermal plastic polyurethanes, sulfonated polystyrene, ethylene-co-acrylic acid polymers and poly(ethylene-co-methacrylic acid) partially neutralized ionomers throughout the composition ranges. Molecular level blends were achieved. The main driving force for the miscibility between the polyurethane ionomers and other ionic or ionic potential polymers are the ionic ionic interactions, urethane-ionic hydrogen bonding and solvation of the cations by polyurethane chains.

The invention has been described with reference to the exemplary embodiments. Modifications and alterations may appear to others upon reading and understanding the specification. The invention is intended to include such modifications and alterations insofar as they come within the scope of the claims.

Having thus described the invention, it is claimed as follows:

1. A polyurethane ionomer composition comprising a thermoplastic polymer blended with a polyurethane ionomer produced by the process of:
   a) reacting a diisocyanate compound with a polyol compound in a solvent to form an isocyanate terminated polyurethane prepolymer; and
   b) reacting the isocyanate terminated polyurethane prepolymer with a finely divided substantially anhydrous metal salt of an acid-group containing polyol in a solvent to form a polyurethane ionomer.

2. The composition of claim 1, wherein, in the process, the polyurethane ionomer is further treated by one or more steps comprising drying, heating and removal of solvent.

3. The composition of claim 1, wherein, in the process, the diisocyanate has a formula:

$$OCN-[A]-NCO \qquad (I)$$

where

A=a straight chain or branched chain aliphatic group, a substituted straight chain or branched chain aliphatic group or an aromatic or substituted aromatic group.

4. The composition of claim 1, wherein, in the process, the polyol is a diol.

5. The composition of claim 4, wherein, in the process, the diol has the formula:

$$HO-[B]_n-OH \qquad (II)$$

where

B=a straight chain or branched chain aliphatic group, a substituted straight chain or branched chain aliphatic group or an aromatic or substituted aromatic group, a polyether or a polyester, and;

n=1–300.

6. The composition of claim 1, wherein, in the process, the diisocyanate has the formula:

$$OCN-[A]-NCO \qquad (I)$$

where

A=a straight chain or branched chain aliphatic group, a substituted straight chain or branched chain aliphatic group or an aromatic or substituted aromatic group, and;

and the polyol has the formula $$HO-[B]_n-OH \quad (II)$$

where
B=a straight chain or branched chain aliphatic group, a substituted straight chain or branched chain aliphatic group or an aromatic or substituted aromatic group, a polyether or a polyester, and;
n=1–300;
wherein
the reaction of the diisocyanate of formula (I) with the polyol of formula (II) produces an isocyanate terminated polyurethane prepolymer having a formula:
(III)

$$OCN-[A]-\left(NHC(=O)-O-[B]_n-O-C(=O)-NH-[A]\right)_x-NCO \quad (III)$$

where
x=1.0–100.

7. The composition of claim 6, wherein, in the process, the reaction takes place at a temperature of about 65° C.

8. The composition of claim 6, wherein, in the process, the reaction time is about 2 hours.

9. The composition of claim 1, wherein, in the process, the finely divided metal salt of an acid-group containing polyol is a metal dimethylolpropionate or a metal acetylacetonate.

10. The composition of claim 1, wherein, in the process, the metal in the metal salt of an acid-group containing polyol is a group IA, IB, IIA, IIB, IIIA, IIIB, IVA, IVB, VA, VB, VIA, VIB, VIIB, VIII, lanthamide or transition metal.

11. The composition of claim 10, wherein, in the process, the metal is selected from the group consisting of $Ba^{2+}$, $Ca^{2+}$, $Cs^+$, $K^+$, $Li^+$, $Mg.^{2+}$, $Na^+$, $Rb^+$, $Sr^{2+}$, and $Zn^{2+}$.

12. The composition of claim 1, wherein the thermoplastic polymer comprises polystyrene.

13. The composition of claim 1, wherein the thermoplastic polymer comprises an ionomer.

14. The composition of claim 1, wherein the thermoplastic polymer comprises a thermoplastic polyurethane.

15. The composition of claim 1, wherein the thermoplastic polymer comprises an ethylene-acrylate copolymer.

16. The composition of claim 1, wherein the thermoplastic polymer comprises a poly(ethylene-methacrylic acid) ionomer.

17. The composition of claim 1, wherein the thermoplastic polymer comprises a poly(ethylene-acrylic acid) ionomer.

18. The composition of claim 1, wherein the thermoplastic polymer comprises a sulfonated polystyrene.

19. A polyurethane ionomer composition comprising the reaction product of a polymer blended with a polyurethane ionomer produced by the process of:

a) reacting a diisocyanate compound having the formula $$OCN-[A]-NCO \quad (I)$$

where
A=a straight chain or branched chain aliphatic group, a substituted straight chain or branched chain aliphatic group or an aromatic or substituted aromatic group;
with a polyol having the formula $$HO-[B]_n-OH \quad (II)$$

where
B=a straight chain or branched chain aliphatic group, a substituted straight chain or branched chain aliphatic group or an aromatic or substituted aromatic group, a polyether or a polyester, and;
n=1–300;

in a solvent to form an isocyanate terminated polyurethane prepolymer having the formula $$OCN-[A]-\left(NHC(=O)-O-[B]_n-O-C(=O)-NH-[A]\right)_x-NCO \quad (III)$$

where x=1.0–100;

b) reacting the isocyanate terminated polyurethane prepolymer of formula (III) with a finely divided metal dimethylolpropionate having the formula $$M\left[-O-C(=O)-C(CH_2OH)(R)(CH_2OH)\right]_n \quad (IV)$$

where M=$Ba^{2+}$, $Ca^{2+}$, $Cs^+$, $K^+$, $Li^+$, $Mg^{2+}$, $Na^+$, $Rb^+$, $Sr^{2+}$, and $Zn^{2+}$;
R=H or $C_1-C_3$ alkyl and;
n=1 or 2;

in the presence of a solvent to form a polyurethane ionomer having the formula:

$$\sim[A]-NHC(=O)-O-[B]_n-O-C(=O)-NH-[A]-NHC(=O)-OCH_2-C(R)(CO_2^-\cdots O\ M)-CH_2O-C(=O)-NH\sim \quad (V)$$

and c) treating the polyurethane ionomer of formula V to remove any remaining solvent wherein a polyurethane ionomer product is produced.

20. The composition of claim 19, wherein, in the process, the solvent is dimethylformamide (DMF).

21. The composition of claim 19, wherein, in the process, the reaction of step (a) takes place at a temperature of about 65° C.

22. The composition of claim 19, wherein, in the process, the reaction of step (b) takes place at a temperature of about 70° C.

23. The composition of claim 19, wherein, in the process, the compound of formula IV is zinc dimethylolpropionate.

24. The composition of claim 19, wherein, in the process, the reaction time for step (a) is about 2 hours.

25. The composition of claim 19, wherein, in the process, the reaction time for step (b) is about 2 hours.

26. The composition of claim 19, wherein the thermoplastic polymer comprises polystyrene.

27. The composition of claim 19, wherein the thermoplastic polymer comprises an ionomer.

28. The composition of claim 19, wherein the thermoplastic polymer comprises a thermoplastic polyurethane.

29. The composition of claim 19, wherein the thermoplastic polymer comprises an ethylene-acrylate copolymer.

30. The composition of claim 19, wherein the thermoplastic polymer comprises a poly(ethylene-methacrylic acid) ionomer.

31. The composition of claim 19, wherein the thermoplastic polymer comprises a poly(ethylene-acrylic acid) ionomer.

32. The composition of claim 19, wherein the thermoplastic polymer comprises a sulfonated polystyrene.

33. A polyurethane ionomer composition comprising a blend of polymer with a polyurethane ionomer having the formula

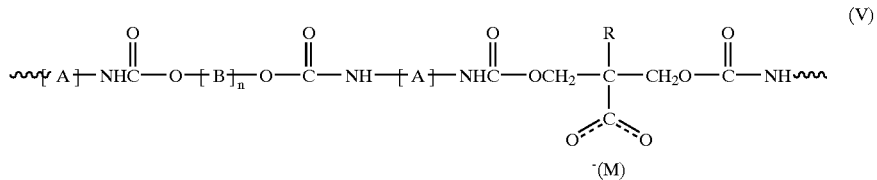

where

A=a straight chain or branched chain aliphatic group, a substituted straight chain or branched chain aliphatic group or an aromatic or substituted aromatic group;

B=a straight chain or branched chain aliphatic group, a substituted straight chain or branched chain aliphatic group or an aromatic or substituted aromatic group, a polyether or a polyester, and;

n=1–300;

M=$Ba^{2+}$, $Ca^{2+}$, $Cs^+$, $K^+$, $Li^+$, $Mg^{2+}$, $Na^+$, $Rb^+$, $Sr^{2+}$, and $Zn^{2+}$;

R=H or $C_1$–$C_3$ alkyl and;

and further wherein the polyurethane ionomer has a stable storage modulus (E') having a 50° breadth in the −20° C. to 70° C. range.

34. A polyurethane ionomer composition comprising a blend of a thermoplastic polymer with one or more polyurethane ionomers having a formula:

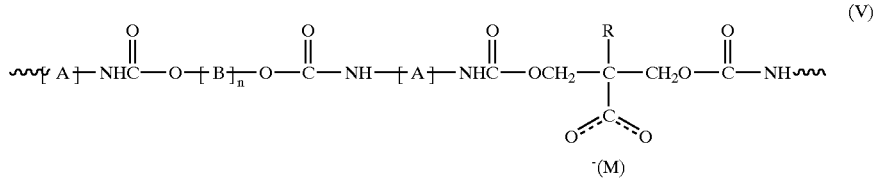

where

A=a straight chain or branched chain aliphatic group, a substituted straight chain or branched chain aliphatic group or an aromatic or substituted aromatic group;

B=a straight chain or branched chain aliphatic group, a substituted straight chain or branched chain aliphatic group or an aromatic or substituted aromatic group, a polyether or a polyester, and;

n=1–300;

M=$Ba^{2+}$, $Ca^{2+}$, $Cs^+$, $K^+$, $Li^+$, $Mg^{2+}$, $Na^+$, $Rb^+$, $Sr^{2+}$, and $Zn^{2+}$;

R=H or $C_1$–$C_3$ alkyl;

and further wherein the polyurethane ionomer has a stable storage modulus (E') having a 50° breadth in the −20° C. to 70° C. range.

35. A golf ball component comprising one or more compositions of claim 1.

36. A golf ball cover composition comprising one or more compositions prepared by the process according to claim 19.

* * * * *